(12) United States Patent
Taguchi et al.

(10) Patent No.: US 11,405,519 B2
(45) Date of Patent: Aug. 2, 2022

(54) INFORMATION PROCESSING APPARATUS AND INFORMATION PROCESSING METHOD

(71) Applicant: Oki Data Corporation, Tokyo (JP)

(72) Inventors: Ayumi Taguchi, Tokyo (JP); Tsutomu Iwasaki, Tokyo (JP)

( * ) Notice: Subject to any disclaimer, the term of this patent is extended or adjusted under 35 U.S.C. 154(b) by 0 days.

(21) Appl. No.: 17/190,961

(22) Filed: Mar. 3, 2021

(65) Prior Publication Data

US 2021/0281701 A1 Sep. 9, 2021

(30) Foreign Application Priority Data

Mar. 6, 2020 (JP) .............................. JP2020-038715
Mar. 18, 2020 (JP) .............................. JP2020-047454

(51) Int. Cl.
*G06F 15/00* (2006.01)
*H04N 1/00* (2006.01)

(52) U.S. Cl.
CPC ..... *H04N 1/00896* (2013.01); *H04N 1/00082* (2013.01); *H04N 1/00209* (2013.01); *H04N 1/00352* (2013.01); *H04N 1/00413* (2013.01); *H04N 2201/0094* (2013.01)

(58) Field of Classification Search
CPC ........... H04N 1/00896; H04N 1/00082; H04N 1/00209; H04N 1/00352; H04N 1/00413; H04N 2201/0094
USPC ...................................................... 358/1.15
See application file for complete search history.

(56) References Cited

U.S. PATENT DOCUMENTS

| | | | | |
|---|---|---|---|---|
| 2009/0119522 A1* | 5/2009 | Satoh | .................... | G06F 1/3209 713/320 |
| 2012/0224206 A1* | 9/2012 | Takahashi | ............. | G06F 3/1221 358/1.13 |
| 2013/0198546 A1* | 8/2013 | Fujisawa | ................. | H04L 12/12 713/323 |
| 2014/0006821 A1* | 1/2014 | Fujisawa | ................... | G06F 1/32 713/320 |
| 2014/0298054 A1* | 10/2014 | Hasui | .................... | G06F 1/3243 713/320 |
| 2020/0133593 A1* | 4/2020 | Watanabe | ............. | G06F 3/1293 |

FOREIGN PATENT DOCUMENTS

JP 2012-179788 A 9/2012

* cited by examiner

*Primary Examiner* — Mark R Milia

(57) ABSTRACT

An information processing apparatus includes a communication unit, a determination unit, a power mode setting unit, an input process unit, and a registration unit. The communication unit receives a communication packet. The determination unit determines whether the communication packet received by the communication unit in a second power mode of first and the second power modes meets at least one of a plurality of determination conditions included in determination condition information. The second power mode is lower in electric power consumption than the first power mode. The power mode setting unit switches a power mode from the second power mode to the first power mode on the basis of a result of determination performed by the determination unit. The input process unit receives user operation. The registration unit registers the determination conditions in the determination condition information on the basis of the user operation received by the input process unit.

7 Claims, 30 Drawing Sheets

| No. | NAME OF SERVICE | DETERMINATION CONDITION |
|---|---|---|
| 1 | IPv4 | Protocol type : IPv4<br>Destination MAC address:<br>MAC address of apparatus |
| 2 | IPv6 | Protocol type : IPv6<br>Destination MAC address:<br>MAC address of apparatus |
| 3 | Bonjour | Protocol type : IPv4<br>Protocol kind : UDP<br>Destination port number : 5353<br>Destination IP address : 224.0.0.251 |
| 4 | Bonjour | Protocol type : IPv6<br>Protocol kind : UDP<br>Destination port number : 5353<br>Destination IP address : [FF02::FB] |
| 5 | 802.1X | Protocol type : 802.1X |
| 6 | SNMP | Protocol type : IPv4<br>Protocol kind : UDP<br>Destination port number : 161 |
| 7 | WindowsRally | Protocol type : IPv4<br>Protocol kind : UDP<br>Destination port number : 3702 |
| 8 | NBT | Protocol type : IPv4<br>Protocol kind : UDP<br>NBNS data: NetBIOS name of apparatus |
| 9 | Protocol ABC | Protocol type : IPv4<br>Protocol kind : UDP<br>Destination port number : XXXX |

FIG. 2

| No. | NAME OF SERVICE | DETERMINATION CONDITION |
|---|---|---|
| 1 | IPv4 | Protocol type : IPv4<br>Destination MAC address:<br>MAC address of apparatus |
| 2 | IPv6 | Protocol type : IPv6<br>Destination MAC address:<br>MAC address of apparatus |
| 3 | Bonjour | Protocol type : IPv4<br>Protocol kind : UDP<br>Destination port number : 5353<br>Destination IP address : 224.0.0.251 |
| 4 | Bonjour | Protocol type : IPv6<br>Protocol kind : UDP<br>Destination port number : 5353<br>Destination IP address : [FF02::FB] |
| 5 | 802.1X | Protocol type : 802.1X |
| 6 | SNMP | Protocol type : IPv6<br>Protocol kind : UDP<br>Destination port number : 161 |
| 7 | WindowsRally | Protocol type : IPv6<br>Protocol kind : UDP<br>Destination port number : 3702 |
| 8 | NBT | Protocol type : IPv6<br>Protocol kind : UDP<br>NBNS data: NetBIOS name of apparatus |
| 9 | Protocol ABC | Protocol type : IPv6<br>Protocol kind : UDP<br>Destination port number : XXXX |

FIG. 3

| NAME OF SERVICE | DETERMINATION CONDITION | T1 | T2 |
|---|---|---|---|
| IPv4 | Protocol type : IPv4<br>Destination MAC address:<br>MAC address of apparatus | Yes | Yes |
| IPv6 | Protocol type : IPv6<br>Destination MAC address:<br>MAC address of apparatus | Yes | Yes |
| Bonjour | Protocol type : IPv4<br>Protocol kind : UDP<br>Destination port number : 5353<br>Destination IP address : 224.0.0.251 | Yes | Yes |
| Bonjour | Protocol type : IPv6<br>Protocol kind : UDP<br>Destination port number : 5353<br>Destination IP address : [FF02::FB] | Yes | Yes |
| 802.1X | Protocol type : 802.1X | Yes | Yes |
| SNMP | Protocol type : IPv4<br>Protocol kind : UDP<br>Destination port number : 161 | Yes | |
| SNMP | Protocol type : IPv6<br>Protocol kind : UDP<br>Destination port number : 161 | | Yes |
| WindowsRally | Protocol type : IPv4<br>Protocol kind : UDP<br>Destination port number : 3702 | Yes | |
| WindowsRally | Protocol type : IPv6<br>Protocol kind : UDP<br>Destination port number : 3702 | | Yes |
| NBT | Protocol type : IPv4<br>Protocol kind : UDP<br>NBNS data: NetBIOS name of apparatus | Yes | |
| NBT | Protocol type : IPv6<br>Protocol kind : UDP<br>NBNS data: NetBIOS name of apparatus | | Yes |
| Protocol ABC | Protocol type : IPv4<br>Protocol kind : UDP<br>Destination port number : XXXX | Yes | |
| Protocol ABC | Protocol type : IPv6<br>Protocol kind : UDP<br>Destination port number : XXXX | | Yes |

FIG. 4

| No. | NAME OF SERVICE | DETERMINATION CONDITION | FLAG |
|---|---|---|---|
| 1 | IPv4 | Protocol type : IPv4<br>Destination MAC address:<br>MAC address of apparatus | 1 |
| 2 | IPv6 | Protocol type : IPv6<br>Destination MAC address:<br>MAC address of apparatus | 1 |
| 3 | Bonjour | Protocol type : IPv4<br>Protocol kind : UDP<br>Destination port number : 5353<br>Destination IP address : 224.0.0.251 | 1 |
| 4 | Bonjour | Protocol type : IPv6<br>Protocol kind : UDP<br>Destination port number : 5353<br>Destination IP address : [FF02::FB] | 1 |
| 5 | 802.1X | Protocol type : 802.1X | 0 |
| 6 | SNMP | Protocol type : IPv4<br>Protocol kind : UDP<br>Destination port number : 161 | 1 |
| 7 | WindowsRally | Protocol type : IPv4<br>Protocol kind : UDP<br>Destination port number : 3702 | 1 |
| 8 | NBT | Protocol type : IPv4<br>Protocol kind : UDP<br>NBNS data: NetBIOS name of apparatus | 1 |
| 9 | Protocol ABC | Protocol type : IPv4<br>Protocol kind : UDP<br>NBNS data: NetBIOS name of apparatus | 1 |

FIG. 8

| NAME OF SERVICE | PROTOCOL TYPE | NUMBER OF TIMES OF RECEPTION |
|---|---|---|
| SNMP | IPv4 | 3 |
| | IPv6 | 4 |
| WindowsRally | IPv4 | 8 |
| | IPv6 | 5 |
| NBT | IPv4 | 10 |
| | IPv6 | 1 |
| Protocol ABC | IPv4 | 2 |
| | IPv6 | 0 |

FIG. 11

ALERT

If the apparatus is brought into sleep state, IPv6 wireless LAN network communication will be disabled for some protocols.

<HISTORY OF PACKET RECEPTION>

| NAME OF SERVICE | PROTOCOL TYPE | NUMBER OF TIMES OF RECEPTION |
|---|---|---|
| SNMP | IPv4 | 3 |
| | IPv6 | 4 |
| WindowsRally | IPv4 | 8 |
| | IPv6 | 5 |
| NBT | IPv4 | 10 |
| | IPv6 | 1 |
| Protocol ABC | IPv4 | 2 |
| | IPv6 | 0 |

If there is any problem, change user setting of Wake Up command table to Type 1.

FIG. 14

| NAME OF SERVICE | DETERMINATION CONDITION | T1 | T2 |
|---|---|---|---|
| IPv4 | Protocol type : IPv4<br>Destination MAC address:<br>MAC address of apparatus | Yes | Yes |
| IPv6 | Protocol type : IPv6<br>Destination MAC address:<br>MAC address of apparatus | Yes | Yes |
| 802.1X | Protocol type : 802.1X | Yes | Yes |
| Bonjour | Protocol type : IPv4<br>Protocol kind : UDP<br>Destination port number : 5353<br>Destination IP address : 224.0.0.251 | Yes | Yes |
| Bonjour | Protocol type : IPv6<br>Protocol kind : UDP<br>Destination port number : 5353<br>Destination IP address : [FF02::FB] | Yes | Yes |
| SNMP | Protocol type : IPv4<br>Protocol kind : UDP<br>Destination port number : 161 | Yes | |
| SNMP | Protocol type : IPv6<br>Protocol kind : UDP<br>Destination port number : 161 | | Yes |
| WindowsRally | Protocol type : IPv4<br>Protocol kind : UDP<br>Destination port number : 3702 | Yes | |
| WindowsRally | Protocol type : IPv6<br>Protocol kind : UDP<br>Destination port number : 3702 | | Yes |
| NBT | Protocol type : IPv4<br>Protocol kind : UDP<br>NBNS data: NetBIOS name of apparatus | Yes | |
| NBT | Protocol type : IPv6<br>Protocol kind : UDP<br>NBNS data: NetBIOS name of apparatus | | Yes |
| Protocol ABC | Protocol type : IPv4<br>Protocol kind : UDP<br>Destination port number : XXXX | Yes | |
| Protocol ABC | Protocol type : IPv6<br>Protocol kind : UDP<br>Destination port number : XXXX | | Yes |

FIG. 18

| No. | NAME OF SERVICE | DETERMINATION CONDITION |
|---|---|---|
| 1 | IPv4 | Protocol type : IPv4<br>Destination MAC address:<br>MAC address of apparatus |
| 2 | IPv6 | Protocol type : IPv6<br>Destination MAC address:<br>MAC address of apparatus |
| 3 | 802.1X | Protocol type : 802.1X |
| 4 | Bonjour | Protocol type : IPv4<br>Protocol kind : UDP<br>Destination port number : 5353<br>Destination IP address : 224.0.0.251 |
| 5 | Bonjour | Protocol type : IPv6<br>Protocol kind : UDP<br>Destination port number : 5353<br>Destination IP address : [FF02::FB] |
| 6 | SNMP | Protocol type : IPv4<br>Protocol kind : UDP<br>Destination port number : 161 |
| 7 | WindowsRally | Protocol type : IPv4<br>Protocol kind : UDP<br>Destination port number : 3702 |
| 8 | NBT | Protocol type : IPv4<br>Protocol kind : UDP<br>NBNS data: NetBIOS name of apparatus |
| 9 | Protocol ABC | Protocol type : IPv4<br>Protocol kind : UDP<br>Destination port number : XXXX |

FIG. 19

| No. | NAME OF SERVICE | DETERMINATION CONDITION |
|---|---|---|
| 1 | IPv4 | Protocol type : IPv4<br>Destination MAC address:<br>MAC address of apparatus |
| 2 | IPv6 | Protocol type : IPv6<br>Destination MAC address:<br>MAC address of apparatus |
| 3 | 802.1X | Protocol type : 802.1X |
| 4 | Bonjour | Protocol type : IPv4<br>Protocol kind : UDP<br>Destination port number : 5353<br>Destination IP address : 224.0.0.251 |
| 5 | Bonjour | Protocol type : IPv6<br>Protocol kind : UDP<br>Destination port number : 5353<br>Destination IP address : [FF02::FB] |
| 6 | SNMP | Protocol type : IPv6<br>Protocol kind : UDP<br>Destination port number : 161 |
| 7 | WindowsRally | Protocol type : IPv6<br>Protocol kind : UDP<br>Destination port number : 3702 |
| 8 | NBT | Protocol type : IPv6<br>Protocol kind : UDP<br>NBNS data: NetBIOS name of apparatus |
| 9 | Protocol ABC | Protocol type : IPv6<br>Protocol kind : UDP<br>Destination port number : XXXX |

FIG. 20

| No. | NAME OF SERVICE | DETERMINATION CONDITION | PROTOCOL SETTING |
|---|---|---|---|
| 1 | IPv4 | Protocol type : IPv4<br>Destination MAC address:<br>MAC address of apparatus | - |
| 2 | IPv6 | Protocol type : IPv6<br>Destination MAC address:<br>MAC address of apparatus | - |
| 3 | 802.1X | Protocol type : 802.1X | - |
| 4 | Bonjour | Protocol type : IPv4<br>Protocol kind : UDP<br>Destination port number : 5353<br>Destination IP address : 224.0.0.251 | Enabled |
| 5 | Bonjour | Protocol type : IPv6<br>Protocol kind : UDP<br>Destination port number : 5353<br>Destination IP address : [FF02::FB] | Enabled |
| 6 | SNMP | Protocol type : IPv4<br>Protocol kind : UDP<br>Destination port number : 161 | Enabled |
| 7 | WindowsRally | Protocol type : IPv4<br>Protocol kind : UDP<br>Destination port number : 3702 | Disabled |
| 8 | NBT | Protocol type : IPv4<br>Protocol kind : UDP<br>NBNS data: NetBIOS name of apparatus | Disabled |
| 9 | Protocol ABC | Protocol type : IPv4<br>Protocol kind : UDP<br>Destination port number : XXXX | Enabled |

FIG. 24

| No. | NAME OF SERVICE | DETERMINATION CONDITION |
|---|---|---|
| 1 | IPv4 | Protocol type : IPv4<br>Destination MAC address:<br>MAC address of apparatus |
| 2 | IPv6 | Protocol type : IPv6<br>Destination MAC address:<br>MAC address of apparatus |
| 3 | 802.1X | Protocol type : 802.1X |

FIG. 25

| No. | NAME OF SERVICE | DETERMINATION CONDITION |
|---|---|---|
| 1 | IPv4 | Protocol type : IPv4<br>Destination MAC address:<br>MAC address of apparatus |
| 2 | IPv6 | Protocol type : IPv6<br>Destination MAC address:<br>MAC address of apparatus |
| 3 | 802.1X | Protocol type : 802.1X |
| 4 | Bonjour | Protocol type : IPv4<br>Protocol kind : UDP<br>Destination port number : 5353<br>Destination IP address : 224.0.0.251 |
| 5 | Bonjour | Protocol type : IPv6<br>Protocol kind : UDP<br>Destination port number : 5353<br>Destination IP address : [FF02::FB] |
| 6 | SNMP | Protocol type : IPv4<br>Protocol kind : UDP<br>Destination port number : 161 |
| 7 | Protocol ABC | Protocol type : IPv4<br>Protocol kind : UDP<br>Destination port number : XXXX |

FIG. 26

| No. | NAME OF SERVICE | DETERMINATION CONDITION | PROTOCOL SETTING |
|---|---|---|---|
| 1 | IPv4 | Protocol type : IPv4<br>Destination MAC address:<br>MAC address of apparatus | – |
| 2 | IPv6 | Protocol type : IPv6<br>Destination MAC address:<br>MAC address of apparatus | – |
| 3 | 802.1X | Protocol type : 802.1X | – |
| 4 | Bonjour | Protocol type : IPv4<br>Protocol kind : UDP<br>Destination port number : 5353<br>Destination IP address : 224.0.0.251 | Enabled |
| 5 | Bonjour | Protocol type : IPv6<br>Protocol kind : UDP<br>Destination port number : 5353<br>Destination IP address : [FF02::FB] | Enabled |
| 6 | SNMP | Protocol type : IPv6<br>Protocol kind : UDP<br>Destination port number : 161 | Enabled |
| 7 | WindowsRally | Protocol type : IPv6<br>Protocol kind : UDP<br>Destination port number : 3702 | Disabled |
| 8 | NBT | Protocol type : IPv6<br>Protocol kind : UDP<br>NBNS data: NetBIOS name of apparatus | Disabled |
| 9 | Protocol ABC | Protocol type : IPv6<br>Protocol kind : UDP<br>Destination port number : XXXX | Enabled |

FIG. 27

| No. | NAME OF SERVICE | DETERMINATION CONDITION |
|---|---|---|
| 1 | IPv4 | Protocol type : IPv4<br>Destination MAC address:<br>MAC address of apparatus |
| 2 | IPv6 | Protocol type : IPv6<br>Destination MAC address:<br>MAC address of apparatus |
| 3 | 802.1X | Protocol type : 802.1X |
| 4 | Bonjour | Protocol type : IPv4<br>Protocol kind : UDP<br>Destination port number : 5353<br>Destination IP address : 224.0.0.251 |
| 5 | Bonjour | Protocol type : IPv6<br>Protocol kind : UDP<br>Destination port number : 5353<br>Destination IP address : [FF02::FB] |
| 6 | SNMP | Protocol type : IPv4<br>Protocol kind : UDP<br>Destination port number : 161 |
| 7 | Protocol ABC | Protocol type : IPv4<br>Protocol kind : UDP<br>Destination port number : XXXX |
| 8 | SNMP | Protocol type : IPv6<br>Protocol kind : UDP<br>Destination port number : 161 |
| 9 | Protocol ABC | Protocol type : IPv6<br>Protocol kind : UDP<br>Destination port number : XXXX |

| | NAME OF SERVICE | DETERMINATION CONDITION | FLAG |
|---|---|---|---|
| 1 | IPv4 | Protocol type : IPv4<br>Destination MAC address :<br>MAC address of apparatus | 1 |
| 2 | IPv6 | Protocol type : IPv6<br>Destination MAC address :<br>MAC address of apparatus | 1 |
| 3 | 802.1X | Protocol type : 802.1X | 0 |
| 4 | Bonjour | Protocol type : IPv4<br>Protocol kind : UDP<br>Destination port number : 5353<br>Destination IP address : 224.0.0.251 | 1 |
| 5 | Bonjour | Protocol type : IPv6<br>Protocol kind : UDP<br>Destination port number : 5353<br>Destination IP address : [FF02::FB] | 1 |
| 6 | SNMP | Protocol type : IPv4<br>Protocol kind : UDP<br>Destination port number : 161 | 1 |
| 7 | Protocol ABC | Protocol type : IPv4<br>Protocol kind : UDP<br>Destination port number : XXXX | 1 |
| 8 | SNMP | Protocol type : IPv6<br>Protocol kind : UDP<br>Destination port number : 161 | 1 |
| 9 | Protocol ABC | Protocol type : IPv6<br>Protocol kind : UDP<br>Destination port number : XXXX | 1 |

FIG. 31

INFORMATION PROCESSING APPARATUS AND INFORMATION PROCESSING METHOD

CROSS REFERENCE TO RELATED APPLICATIONS

The present application claims priority from Japanese Patent Application No. 2020-038715 filed on Mar. 6, 2020 and Japanese Patent Application No. 2020-047454 filed on Mar. 18, 2020 the entire contents of each which are hereby incorporated by reference.

BACKGROUND

The technology relates to an information processing apparatus and an information processing method that each perform an information process.

An information processing apparatus often has a sleep mode that is lower in electric power consumption than a normal mode. For example, Japanese Unexamined Patent Application Publication No. 2012-179788 discloses an image forming apparatus that performs switching from a power saving mode to a normal mode on the basis of a protocol requested by an information terminal device.

SUMMARY

An information processing apparatus in a sleep mode performs switching from the sleep mode to a normal mode in a case where a network packet which the information processing apparatus has received satisfies a determination condition. The number of such determination conditions may be limited, for example, as a result of a limited memory capacity. However, it may be desired to effectively reduce electric power consumption also in such a case.

It is desirable to provide an information processing apparatus and an information processing method that each make it possible to effectively reduce electric power consumption.

According to one embodiment of the technology, there is provided an information processing apparatus that includes a communication unit, a determination unit, a power mode setting unit, an input process unit, and a registration unit. The communication unit receives a communication packet. The determination unit determines whether the communication packet received by the communication unit in a second power mode of a first power mode and the second power mode meets at least one of a plurality of determination conditions included in determination condition information. The second power mode is lower in electric power consumption than the first power mode. The power mode setting unit switches a power mode from the second power mode to the first power mode on the basis of a result of determination performed by the determination unit. The input process unit receives user operation. The registration unit registers the plurality of determination conditions in the determination condition information on the basis of the user operation received by the input process unit.

According to one embodiment of the technology, there is provided an information processing apparatus that includes a communication unit, a determination unit, a power mode setting unit, a setting unit, and a registration unit. The communication unit receives a communication packet. The determination unit determines whether the communication packet received by the communication unit in a second power mode of a first power mode and the second power mode meets at least one of a plurality of determination conditions included in determination condition information. The second power mode is lower in electric power consumption than the first power mode. The power mode setting unit switches a power mode from the second power mode to the first power mode on the basis of a result of determination performed by the determination unit. The setting unit sets a first communication protocol to be enabled or disabled. The first communication protocol is supported by the communication unit. The registration unit excludes, in a case where the first communication protocol is set to be disabled, a first determination condition for the communication packet communicated by the first communication protocol from the plurality of determination conditions, and thereby registers the plurality of determination conditions in the determination condition information.

According to one embodiment of the technology, there is provided an information processing method that includes: receiving a communication packet; determining whether the communication packet received in a second power mode of a first power mode and the second power mode meets at least one of a plurality of determination conditions included in determination condition information, the second power mode being lower in electric power consumption than the first power mode; switching a power mode from the second power mode to the first power mode on the basis of a result of the determining; and registering the plurality of determination conditions in the determination condition information.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 2 is an explanatory diagram illustrating an example of a determination table to be stored in a determination table storage unit illustrated in FIG. 1.

FIG. 3 is an explanatory diagram illustrating an example of another determination table to be stored in the determination table storage unit illustrated in FIG. 1.

FIG. 4 is an explanatory diagram illustrating an example of history data illustrated in FIG. 1.

FIG. 8 is an explanatory diagram illustrating an example of a determination table according to another modification of the example embodiment.

FIG. 11 is an explanatory diagram illustrating an example of history data illustrated in FIG. 10.

FIG. 14 is an explanatory diagram illustrating an example of an alert process illustrated in FIG. 13.

FIG. 18 is an explanatory diagram illustrating an example of condition data illustrated in FIG. 17.

FIG. 19 is an explanatory diagram illustrating an example of a determination table illustrated in FIG. 18.

FIG. 20 is an explanatory diagram illustrating an example of another determination table illustrated in FIG. 18.

FIG. 24 is an explanatory diagram illustrating an example of operation of the image forming apparatus illustrated in FIG. 17.

FIG. 25 is another explanatory diagram illustrating an example of the operation of the image forming apparatus illustrated in FIG. 17.

FIG. 26 is still another explanatory diagram illustrating an example of the operation of the image forming apparatus illustrated in FIG. 17.

FIG. 27 is still another explanatory diagram illustrating an example of the operation of the image forming apparatus illustrated in FIG. 17.

FIG. 28 is still another explanatory diagram illustrating an example of the operation of the image forming apparatus illustrated in FIG. 17.

FIG. 31 is an explanatory diagram illustrating an example of a determination table according to another modification of the example embodiment.

DETAILED DESCRIPTION

Figure 1:
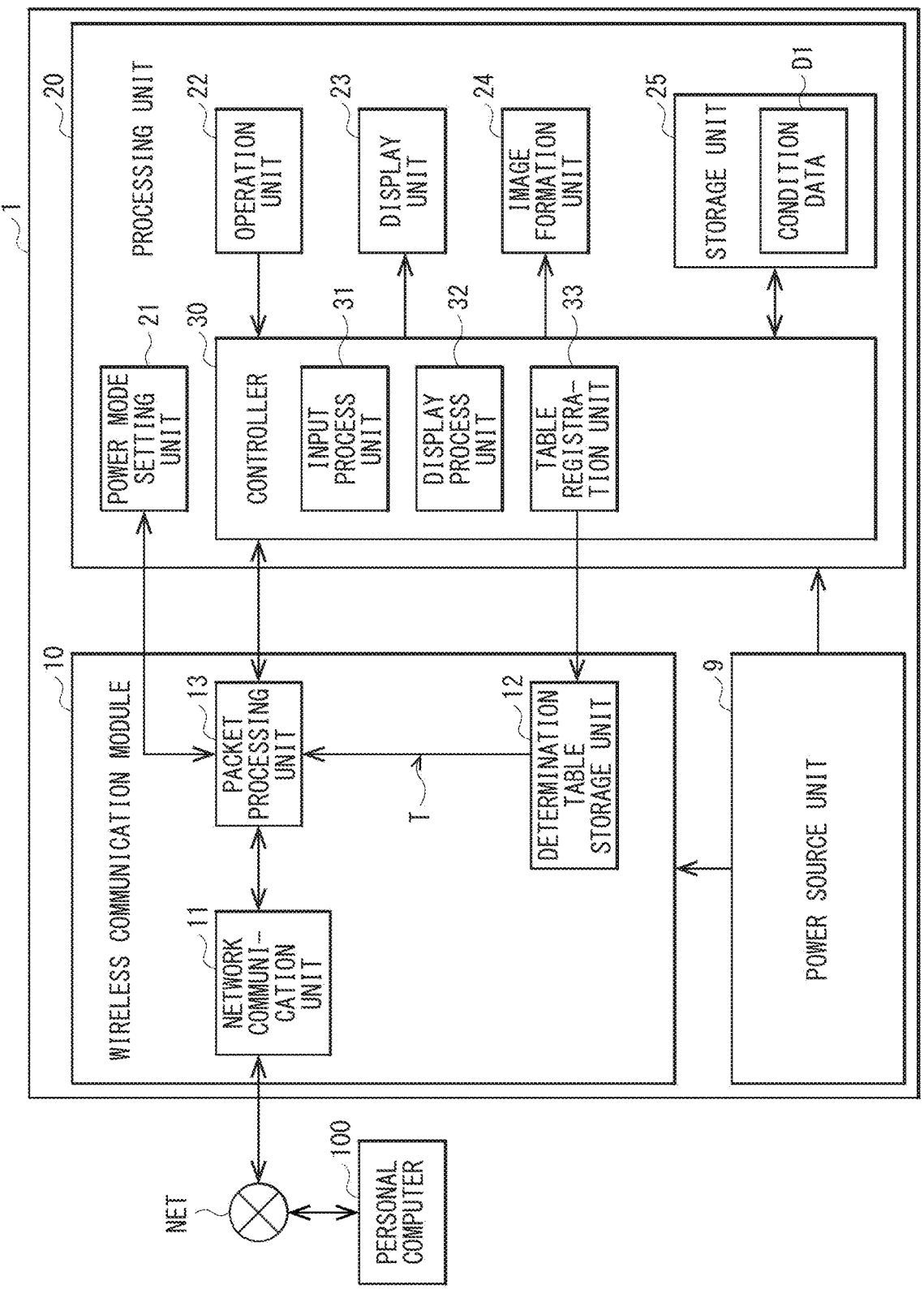
FIG. 1 is a block diagram illustrating an example of a configuration of an image forming apparatus according to one example embodiment of the technology.

Hereinafter, some example embodiments of the technology will be described in detail with reference to the drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Note that the like elements are denoted with the same reference numerals, and any redundant description thereof will not be described in detail. The description will be given in the following order.

1. First Example Embodiment
2. Second Example Embodiment
3. Third Example Embodiment

1. First Example Embodiment

Configuration Example

FIG. 1 illustrates an example of a configuration of an information processing apparatus (an image forming apparatus 1) according to a first example embodiment of the technology. Note that an information processing method according to one embodiment of the technology is described together below as the information processing method is implemented by the example embodiment described below.

The image forming apparatus 1 may be, for example but not limited to, a printer that forms an image on a medium such as paper. The image forming apparatus 1 may have two power modes M, i.e., a normal mode M1 and a sleep mode M2. The normal mode M1 may allow the image forming apparatus 1 to perform image formation operation of forming an image on a medium on the basis of print data, for example. The sleep mode M2 may allow for reduction of electric power consumption compared with the normal mode M1 in a case where the image formation operation is not performed, for example. For example, the image forming apparatus 1 may switch the power mode M from the normal mode M1 to the sleep mode M2 in a case where a predetermined time elapses after the image forming apparatus 1 performs the image formation operation in the normal mode M1. Further, the image forming apparatus 1 may switch the power mode M from the sleep mode M2 to the normal mode M1 in a case where the image forming apparatus 1 receives a predetermined network packet P that satisfies a determination condition in the sleep mode M2, as will be described later.

The image forming apparatus 1 may include a power source unit 9, a wireless communication module 10, and a processing unit 20.

The power source unit 9 may generate various direct-current power source voltages, for example, on the basis of alternating-current electric power supplied from a system power source, and supply the generated power source voltages to the wireless communication module 10 and the processing unit 20.

The wireless communication module 10 may perform communication with a network apparatus by means of a wireless local area network (LAN). The wireless communication module 10 may be allowed to perform communication on the basis of the power source voltage supplied from the power source unit 9 in both the normal mode M1 and the sleep mode M2. The wireless communication module 10 may include a network communication unit 11, a determination table storage unit 12, and a packet processing unit 13.

The network communication unit 11 may exchange a network packet P with the network apparatus by means of the wireless LAN. In this example, the network communication unit 11 may be coupled to a personal computer 100 via a network NET.

The determination table storage unit 12 may hold a determination table T. The determination table T may include information, related to a determination condition of a network packet P, that causes switching of the power mode M of the image forming apparatus 1 from the sleep mode M2 to the normal mode M1 in a case where the network communication unit 11 receives the network packet P in the sleep mode M2. In this example, the determination table T may be allowed to include nine or less determination conditions. The determination table storage unit 12 may include, for example, a volatile semiconductor memory. For example, the processing unit 20 may register the determination table T in the determination table storage unit 12 when the image forming apparatus 1 is turned on. In the determination table storage unit 12, one of two determination tables T, i.e., determination tables T1 and T2, may be registered, as will be described below.

FIG. 2 illustrates an example of the determination table T1. FIG. 3 illustrates an example of the determination table T2. The determination table T1 may be favorably used in a case where the network NET which the image forming apparatus 1 is coupled to mainly carries a network packet P of Internet Protocol version 4 (IPv4). The determination table T2 may be favorably used in a case where the network NET which the image forming apparatus 1 is coupled to mainly carries a network packet P of Internet Protocol version 6 (IPv6).

The determination tables T1 and T2 may each include nine determination conditions in this example. In a case where the network packet P meets at least one of the nine determination conditions included in the determination table T stored in the determination table storage unit 12, the wireless communication module 10 may switch the power mode M of the image forming apparatus 1 from the sleep mode M2 to the normal mode M1.

Referring to the determination table T1 illustrated in FIG. 2, for example, the determination condition for the service "IPv4" may be that: the protocol type is IPv4; and the destination media access control (MAC) address is a MAC address of the image forming apparatus 1. The determination condition for the service "IPv6" may be that: the protocol type is IPv6; and the destination MAC address is the MAC address of the image forming apparatus 1. The determination table T1 may include two determination conditions for the service "Bonjour". A first determination condition for the service "Bonjour" may be that: the protocol type is IPv4; the protocol kind is user datagram protocol (UDP); the destination port number is 5353; and the destination Internet protocol (IP) address is 224.0.0.251. This destination IP address may be a multicast address. A second determination condition for the service "Bonjour" may be that: the protocol type is IPv6; the protocol kind is UDP; the destination port number is 5353; and the destination IP address is [FF02::FB]. This destination IP address may be a multicast address. The determination condition for the service "802.1X" may be that the protocol type is 802.1X. The determination condition for the service "SNMP (Simple Network Management Protocol)" may be that: the protocol type is IPv4; the protocol kind is UDP; and the destination port number is 161. The determination condition for the service "WindowsRally" may be that: the protocol type is IPv4; the protocol kind is UDP; and the destination port number is 3702. The determination condition for the service "NBT (NetBIOS over TCP/IP)" may be that: the protocol type is IPv4; the protocol kind is UDP; and the NetBIOS name server (NBNS) data is a NetBIOS name of the image forming apparatus 1. A protocol ABC may be an original protocol developed by a manufacturer of the image forming apparatus 1, for example. The determination condition for the service "protocol ABC" may be that: the protocol type is IPv4; the protocol kind is UDP; and the destination port number is a predetermined number ("XXXX" in FIG. 2).

As described above, the determination condition may be set as a combination of any of, for example but not limited to, the protocol type, the destination MAC address, the protocol kind, the destination port number, and the destination IP address.

The determination table T1 may be favorably used in the case where the image forming apparatus 1 is coupled to a network that mainly carries the IPv4 network packet P, as described above. However, the determination table T1 may also include some determination conditions in which the protocol type is IPv6, for example, as the determination conditions for the services "IPv6" and "Bonjour". Moreover, the two determination conditions for the service "Bonjour" may include the determination condition related to IPv4 and the determination condition related to IPv6.

Referring to the determination table T2 illustrated in FIG. 3, for example, the respective determination conditions for the services "IPv4", "IPv6", "Bonjour", and "802.1X" may be similar to those in the determination table T1 illustrated in FIG. 2. The determination conditions for the services "SNMP", "WindowsRally", "NBT", and "protocol ABC" may be similar to those for the services "SNMP", "WindowsRally", "NBT", and "protocol ABC" in the determination table T1 illustrated in FIG. 2, respectively, except for that the protocol type is changed from IPv4 to IPv6.

The determination table T2 may be favorably used in the case where the image forming apparatus 1 is coupled to a network that mainly carries the IPv6 network packet P, as described above. However, the determination table T2 may also include some determination conditions in which the protocol type is IPv4, for example, as the determination conditions for the services "IPv4" and "Bonjour".

As described above, one of the two determination tables T1 and T2 may be registered in the determination table storage unit 12. This allows for effective reduction of electric power consumption in the image forming apparatus 1. That is, in a case of constantly using a single determination table, it is difficult to set many determination conditions because of the limited memory capacity, for example. In such a case, it is difficult to cover all of the services including, without limitation: a printing protocol such as Port9100, Line Printer daemon Protocol (LPR), or Internet Printing Protocol (IPP); a device detection service such as Bonjour; and a network communication protocol such as SNMP. It is therefore difficult to effectively reduce electric power consumption. To address this, the two determination tables T1 and T2 may be provided for the image forming apparatus 1. For example, as illustrated in FIGS. 2 and 3, the necessary services "Ipv4", "IPv6", "Bonjour", and "802.1X" may be set in both of the determination tables T1 and T2, and other services may be set in one of the determination tables T1 and T2. Further, the determination table T to be registered in the determination table storage unit 12 may be switchable. This allows for registration of the determination table T appropriate for the use environment of the image forming apparatus 1, as will be described later. Accordingly, it is possible to effectively reduce electric power consumption in the image forming apparatus 1.

The packet processing unit 13 may supply, to the processing unit 20, reception data included in the network packet P received by the network communication unit 11 in a case where the power mode M is the normal mode M1. In the case where the power mode M is the sleep mode M2 and where the network communication unit 11 receives a network packet P, the packet processing unit 13 may confirm whether the received network packet P meets at least one of the plurality of determination conditions included in the determination table T stored in the determination table storage unit 12. In a case where the network packet P meets at least one of the determination conditions, the packet processing unit 13 may generate a return command CMD that instructs switching from the sleep mode M2 to the normal mode M1, and may supply the generated return command CMD to a power mode setting unit 21 of the processing unit 20. The power mode setting unit 21 will be described later. Further, after the processing unit 20 starts operation, the packet processing unit 13 may supply the reception data included in the network packet P to the processing unit 20. In a case where the network packet P meets none of the determination conditions, the packet processing unit 13 may discard the network packet P.

Further, the packet processing unit 13 may generate a network packet P on the basis of transmission data supplied from the processing unit 20, and supply the generated network packet P to the network communication unit 11.

The processing unit 20 may perform a process on the basis of the network packet P received by the wireless communication module 10. The processing unit 20 may include the power mode setting unit 21, an operation unit 22, a display unit 23, an image formation unit 24, a storage unit 25, and a controller 30.

The power mode setting unit 21 may set the power mode M of the image forming apparatus 1. In the normal mode M1, the power mode setting unit 21 may supply the power source voltage received from the power source unit 9 to each of the blocks of the processing unit 20. In the sleep mode M2, the power mode setting unit 21 may stop supply of the power source voltage received from the power source unit 9 to each of the blocks of the processing unit 20 except the power mode setting unit 21. The power mode setting unit 21 may switch the power mode M from the normal mode M1 to the sleep mode M2, for example, in a case where a predetermined time elapses after the image forming apparatus 1 performs the image formation operation in the normal mode M1. The power mode setting unit 21 may switch the power mode M from the sleep mode M2 to the normal mode M1, for example, in a case where the power mode setting unit 21 receives the return command CMD from the wireless communication module 10.

The operation unit 22 may receive user operation. The operation unit 22 may include, for example but not limited to, various buttons and a touch panel.

The display unit 23 may display information such as an operation state of the image forming apparatus 1. The display unit 23 may include, for example but not limited to, a liquid crystal display and various indicators.

The image formation unit 24 may perform image formation operation on the basis of an instruction given from the controller 30 in a case where the image forming apparatus 1 receives print data. The image formation operation may be operation of forming an image on a medium such as paper.

The storage unit 25 may be, for example but not limited to, a non-volatile storage. The storage unit 25 may hold, for example but not limited to, firmware and various kinds of setting information. The storage unit 25 may include, for example but not limited to, a semiconductor memory. The storage unit 25 may hold condition data D1. The condition data D1 may include information related to the determination conditions to be registered in the determination table storage unit 12. The condition data D1 may be used when a table registration unit 33 of the controller 30 registers the determination table T in the determination table storage unit 12. The table registration unit 33 will be described later.

FIG. 4 illustrates an example of the condition data D1. The condition data D1 may include information related to a plurality of determination conditions. The condition data D1 may also include information, for each of the determination conditions, indicating whether the determination condition is to be included in the determination table T1 or is to be included in the determination table T2. For example, the determination condition with "Yes" in the "T1" column may be the determination condition to be included in the determination table T1, and the determination condition with "Yes" in the "T2" column may be the determination condition to be included in the determination table T2.

The controller 30 may control operation of the image forming apparatus 1. The controller 30 may include, for example but not limited to, a processor that is able to execute a program and a random-access memory (RAM). For example, upon receiving print data from the packet processing unit 13, the controller 30 may control operation of each block to cause the image forming apparatus 1 to perform the image formation operation. The controller 30 may include an input process unit 31, a display process unit 32, and the table registration unit 33.

The input process unit 31 may perform an input process of receiving, for example but not limited to, user operation performed on the operation unit 22 and user operation performed on the personal computer 100 that performs communication with the image forming apparatus 1.

The display process unit 32 may perform a display process of generating display information to be displayed on, for example but not limited to, the display unit 23 and the display unit of the personal computer 100 that performs communication with the image forming apparatus 1.

The table registration unit 33 may register a plurality of pieces of determination information in the determination table T on the basis of the selection operation performed by a user, with use of the condition data D1 stored in the storage unit 25. The table registration unit 33 may thereby register the determination table T in the determination table storage unit 12 of the wireless communication module 10.

The network communication unit 11 may correspond to a "communication unit" in one specific but non-limiting embodiment of the technology. The packet processing unit 13 and the determination table storage unit 12 may correspond to a "determination unit" in one specific but non-limiting embodiment of the technology. The power mode setting unit 21 may correspond to a "power mode setting unit" in one specific but non-limiting embodiment of the technology. The input process unit 31 may correspond to an "input process unit" in one specific but non-limiting embodiment of the technology. The display process unit 32 may correspond to a "display process unit" in one specific but non-limiting embodiment of the technology. The table registration unit 33 may correspond to a "registration unit" in one specific but non-limiting embodiment of the technology. The network packet P may correspond to a "communication packet" in one specific but non-limiting embodiment of the technology. The normal mode M1 may correspond to a "first power mode" in one specific but non-limiting embodiment of the technology. The sleep mode M2 may correspond to a "second power mode" in one specific but non-limiting embodiment of the technology. The determination table T may correspond to "determination condition information" in one specific but non-limiting embodiment of the technology.

[Operation and Workings]

A description is given next of operation and workings of the image forming apparatus 1 according to the first example embodiment.

[Outline of Overall Operation]

First, an outline of overall operation of the image forming apparatus 1 is described with reference to FIG. 1. The power source unit 9 may generate various direct-current power source voltages, for example, on the basis of alternating-current electric power supplied from a system power source, and supply the generated power source voltages to the wireless communication module 10 and the processing unit 20. The wireless communication module 10 may perform communication with a network apparatus by means of the wireless LAN. The processing unit 20 may perform a process on the basis of the network packet P received by the wireless communication module 10. For example, in a case where the wireless communication module 10 receives a network packet P including print data, the processing unit 20 may form an image on a medium such as paper in accordance with the print data. For example, in a case where the wireless communication module 10 receives a network packet P including an IPP apparatus information acquisition command, the processing unit 20 may perform a process of returning a response corresponding to the command. The power mode setting unit 21 of the processing unit 20 may set the power mode M of the image forming apparatus 1. In the normal mode M1, the power mode setting unit 21 may supply the power source voltage received from the power source unit 9 to each of the blocks of the processing unit 20. In the sleep mode M2, the power mode setting unit 21 may stop supply of the power source voltage received from the power source unit 9 to each of the blocks of the processing unit 20 except the power mode setting unit 21.

[Detailed Operation]

In a case where the power mode M is the normal mode M1, first, the image forming apparatus 1 may register the determination table T in the determination table storage unit 12 of the wireless communication module 10 on the basis of user operation. This operation is described below in detail.

For example, when the user operates the operation unit 22, the input process unit 31 of the controller 30 may receive the user operation. The display process unit 32 may generate menu screen information adapted to configure setting of the image forming apparatus 1, on the basis of the received user operation. The display unit 23 may display a menu screen on the basis of the generated menu screen information. The user may perform operation on the operation unit 22 while seeing the displayed menu screen. The input process unit 31 may receive the user operation thus performed by the user. Further, the display process unit 32 may generate setting screen information for the determination table T, and the display unit 23 may display a setting screen A1 on the basis of the generated setting screen information.

Figure 5:
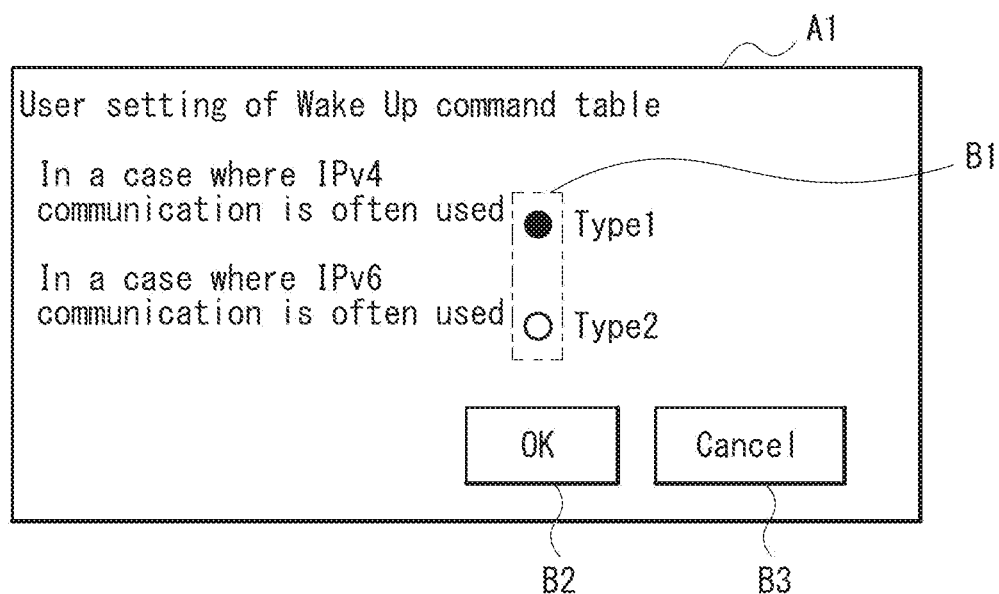
FIG. 5 is an explanatory diagram illustrating an example of a setting screen adapted to receive selection operation for the determination table.

FIG. 5 illustrates an example of the setting screen A1. The setting screen A1 may include two radio buttons B1, an OK button B2, and a cancel button B3. The two radio buttons B1 may allow a user to select which of the IPv4 communication and the IPv6 communication is often performed in the network NET which the image forming apparatus 1 is coupled to. The user may select one of the two radio buttons B1. In a case where the IPv4 communication is often performed, the user may operate the radio button B1 related to "Type 1". In a case where the IPv6 communication is often performed, the user may operate the radio button B1 related to "Type 2". The OK button B2 may be operated by the user in a case where the user wishes to apply the setting displayed on the setting screen A1. The cancel button B3 may be operated by the user in a case where the user wishes to cancel the setting displayed on the setting screen A1.

The input process unit 31 may receive selection operation performed by the user on the setting screen A1. The table registration unit 33 may register the determination table T in the determination table storage unit 12 of the wireless communication module 10 on the basis of the received selection operation. For example, in a case where the user has selected the radio button B1 related to "Type 1", the IPv4 communication is to be often performed in the network NET. Therefore, the table registration unit 33 may register the determination table T1 in the determination table storage unit 12 on the basis of the determination conditions that are to be included in the determination table T1 in the condition data D1 (FIG. 4) stored in the storage unit 25. In a case where the user has selected the radio button B1 related to "Type 2", the IPv6 communication is to be often performed in the network NET. Therefore, the table registration unit 33 may register the determination table T2 in the determination table storage unit 12 on the basis of the determination conditions that are to be included in the determination table T2 in the condition data D1 stored in the storage unit 25. The storage unit 25 may store, as setting information, which of the determination tables T1 and T2 has been registered.

Thereafter, the table registration unit 33 may register the determination table T in the determination table storage unit 12 of the wireless communication module 10 on the basis of the setting information and the condition data D1 stored in the storage unit 25 every time when the image forming apparatus 1 is turned on.

Although the user may operate the operation unit 22 in the example described above, this is non-limiting. In another example, the user may operate an operation unit of the personal computer 100 that performs communication with the image forming apparatus 1. In this example, when the user operates the operation unit of the personal computer 100, the input process unit 31 of the image forming apparatus 1 may receive the operation performed by the user via the wireless communication module 10. Further, the display process unit 32 may generate the setting screen information for the determination table T, and the wireless communication module 10 may transmit the generated setting screen information to the personal computer 100. The display unit of the personal computer 100 may display a setting screen such as that illustrated in FIG. 5 on the basis of the received setting screen information. When the user performs selection operation on the displayed setting screen, the input process unit 31 of the image forming apparatus 1 may receive the selection operation performed by the user. The table registration unit 33 may register the determination table T in the determination table storage unit 12 of the wireless communication module 10 on the basis of the received selection operation.

The determination table T may be thus registered in the determination table storage unit 12 of the wireless communication module 10. Thereafter, upon receiving a network packet P, the image forming apparatus 1 may perform a process in accordance with the received network packet P. This operation is described below in detail.

Figure 6:
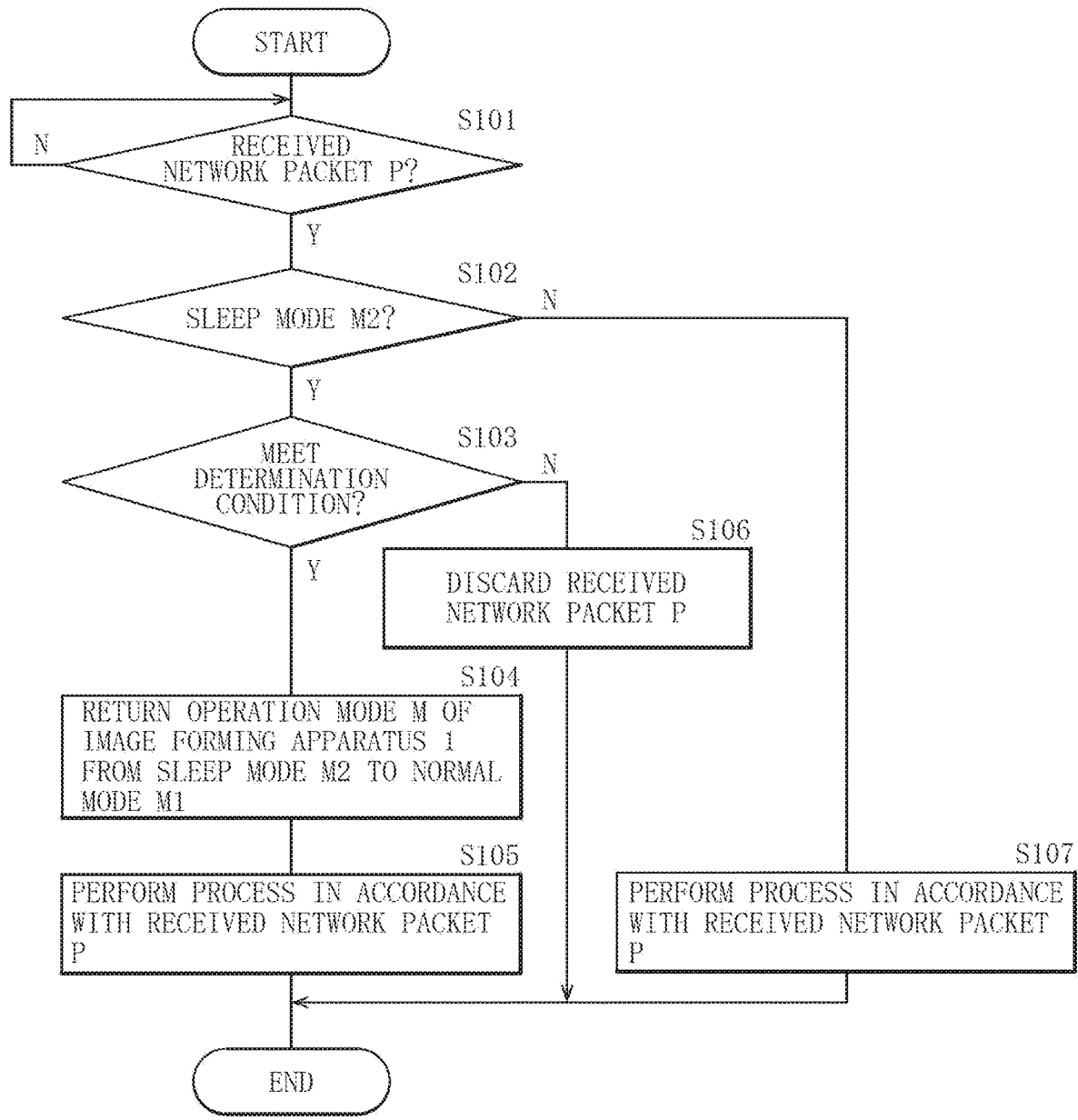
FIG. 6 is a flowchart illustrating an example of operation of the image forming apparatus illustrated in FIG. 1.

FIG. 6 illustrates an example of operation of the image forming apparatus 1.

First, the packet processing unit 13 may confirm whether the network communication unit 11 has received a network packet P (step S101). In a case where the network communication unit 11 has not received the network packet P yet ("N" in step S101), the packet processing unit 13 may repeat the process in step S101 until the network communication unit 11 receives the network packet P.

In a case where the network communication unit 11 has received the network packet P ("Y" in step S101), the packet processing unit 13 may confirm whether the power mode M is the sleep mode M2 (step S102).

In a case where the power mode M is the sleep mode M2 in step S102 ("Y" in step S102), the packet processing unit 13 may confirm whether the network packet P received in step S101 meets at least one of the determination conditions included in the determination table T registered in the determination table storage unit 12 (step S103).

In a case where the network packet P meets at least one of the determination conditions in step S103 ("Y" in step S103), the image forming apparatus 1 may return the power mode M from the sleep mode M2 to the normal mode M1 (step S104). For example, the packet processing unit 13 may generate the return command CMD that instructs returning from the sleep mode M2 to the normal mode M1. Further, the power mode setting unit 21 may switch the power mode M of the image forming apparatus 1 from the sleep mode M2 to the normal mode M1 on the basis of the return command CMD. This may cause the processing unit 20 to start operation.

Thereafter, the image forming apparatus 1 may perform a process in accordance with the network packet P received in step S101 (step S105). For example, after the processing unit 20 starts the operation, the packet processing unit 13 may supply the reception data included in the network packet P to the processing unit 20. The controller 30 of the processing unit 20 may perform a process in accordance with the network packet P on the basis of the reception data. This may bring the flow to an end.

In a case where the network packet P meets none of the determination conditions in step S103 ("N" in step S103), the image forming apparatus 1 may discard the network packet P received in step S101 (step S106). This may bring the flow to the end.

In a case where the power mode M is the normal mode M1 in step S102 ("N" in step S102), the image forming apparatus 1 may perform a process in accordance with the network packet P received in step S101 (step S107). For example, the packet processing unit 13 may supply the reception data included in the network packet P to the processing unit 20. The controller 30 of the processing unit 20 may perform a process in accordance with the network packet P on the basis of the reception data.

This may bring the flow to the end.

As described above, in the image forming apparatus 1, a plurality of determination conditions may be registered in the determination table T on the basis of the user operation. Therefore, for example, as illustrated in FIG. 5, in a case where the IPv4 communication is often performed in the network NET which the image forming apparatus 1 is coupled to, the determination table T1 may be registered. In a case where the IPv6 communication is often performed in the network NET, the determination table T2 may be registered. Accordingly, for example, in an environment where the IPv4 communication is often performed, the power mode M may be returned from the sleep mode M2 to the normal mode M1 in a case where the IPv4 network packet P is received in the sleep mode M2. In a case where the IPv6 network packet P is received in the sleep mode M2, the power mode M may be kept to the sleep mode M2. Thus, in the image forming apparatus 1, it is possible to register the determination conditions, for example, suitable for the use environment of the image forming apparatus 1 on the basis of the user operation. It is therefore possible to effectively reduce electric power consumption.

Further, in the image forming apparatus 1, in a case where the network packet P received in the sleep mode M2 meets at least one of the determination conditions, the power mode M may be returned from the sleep mode M2 to the normal mode M1, and thereafter, a process may be performed in accordance with the received network packet P. In a case where the received network packet P meets none of the determination conditions, the received network packet P may be discarded. This allows a process to be performed on the basis of the network packet P which may be necessary. It is therefore possible to effectively perform a process in accordance with the network packet P.

Moreover, in the image forming apparatus 1, the selection operation of selecting one of the two determination tables T1 and T2 may be received, and the determination conditions included in the determination table selected by the received selection operation may be registered in the determination table T. In one example, the selection operation may include operation of selecting the packet kind of the network packet P to be mainly carried by the network NET, as illustrated in FIG. 5. Accordingly, in the image forming apparatus 1, it is possible to select and register appropriate determination conditions while saving labor of the user.

[Example Effects]

As described above, according to the first example embodiment, a plurality of determination conditions may be registered in a determination table on the basis of user operation. It is therefore possible to effectively reduce electric power consumption.

According to the first example embodiment, selection operation of selecting one of two determination tables may be received, and determination conditions included in the determination table selected by the received selection operation may be registered in the determination table. In one example, the selection operation may include operation of selecting a packet kind of a network packet to be mainly carried by a network. Accordingly, it is possible to register appropriate determination conditions while saving labor of the user.

[Modification 1-1]

According to the first example embodiment, the determination table T selected on the basis of the selection operation performed by the user on the setting screen A1 illustrated in FIG. 5 may be registered as it is in the determination table storage unit 12; however, this is non-limiting. Alternatively, for example, according to Modification 1-1, the determination conditions to be registered may be customized by the user, as in a setting screen A2 illustrated in FIG. 7. The setting screen A2 may include thirteen checkboxes B4, an OK button B5, and a cancel button B6. The thirteen checkboxes B4 may be adapted for the user to select the determination conditions to be registered from the thirteen determination conditions. The thirteen determination conditions may be the thirteen determination conditions stored in the condition data D1 illustrated in FIG. 4. In this example, the user may be allowed to select up to nine checkboxes from the thirteen checkboxes B4. The OK button B5 may be operated by the user in a case where the user wishes to apply the setting displayed on the setting screen A2. The cancel button B6 may be operated by the user in a case where the user wishes to cancel the setting displayed on the setting screen A2.

Figure 7:
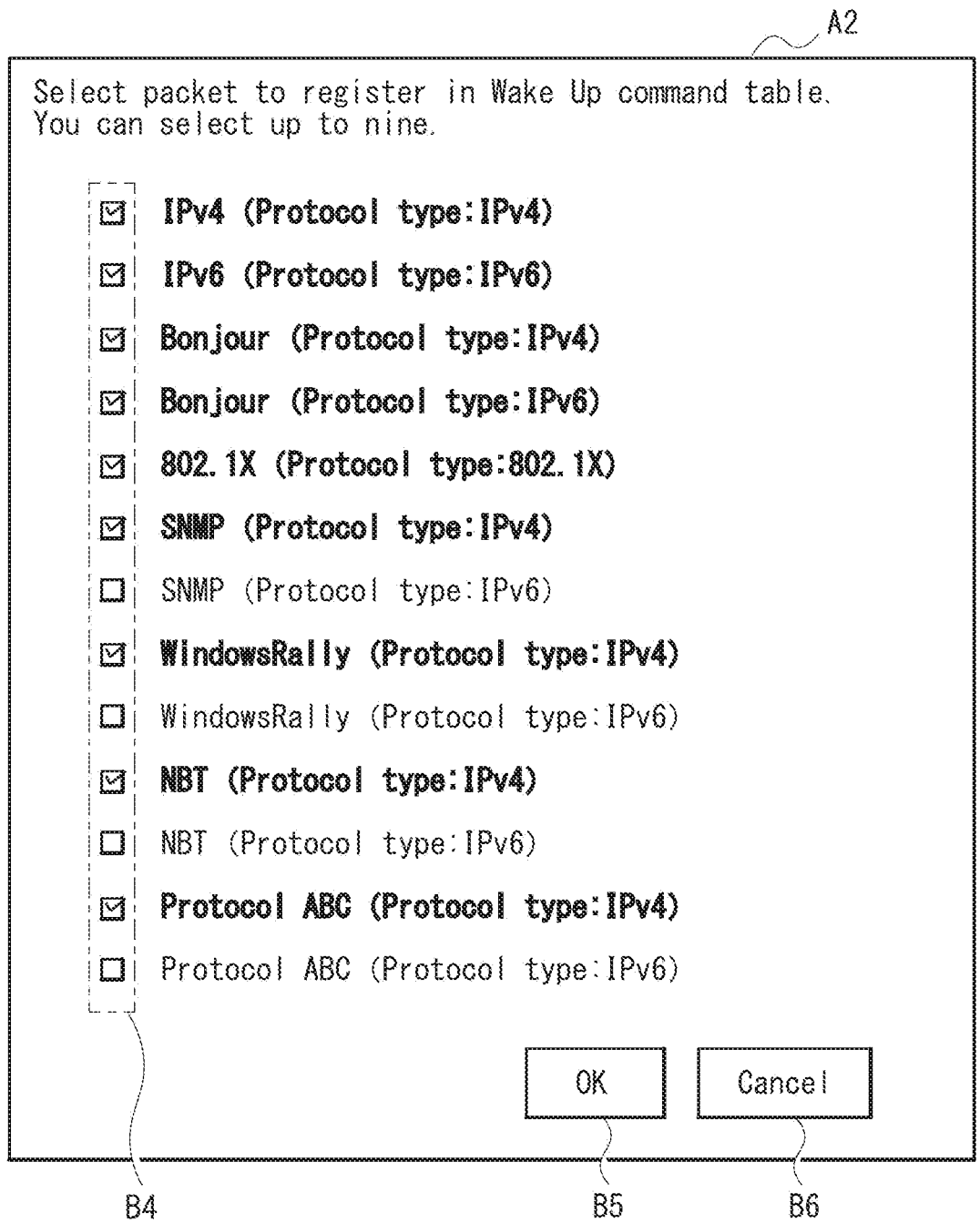
FIG. 7 is an explanatory diagram illustrating an example of a setting screen adapted to receive selection operation for determination conditions to be registered in an image forming apparatus according to a modification of the example embodiment.

In this example, the table registration unit 33 may first select the determination table T1 from the two determination tables T1 and T2 on the basis of the selection operation performed by the user on the setting screen A1 illustrated in FIG. 5, in a manner similar to that in the case of the first example embodiment. Thereafter, the display process unit 32 may generate setting screen information for the setting screen A2 illustrated in FIG. 7. In this example, because the determination table T1 has been selected by the user operation, descriptions of the nine determination conditions included in the determination table T1 may be highlighted in bold type, as illustrated in FIG. 7. The user may operate, for example, the checkboxes B4 with use of the operation unit 22 to thereby select the determination conditions to be registered. The input process unit 31 may receive, on the setting screen A2, condition selection operation performed by the user. Further, the table registration unit 33 may register the determination conditions thus selected in the determination table storage unit 12 as the determination table T.

[Modification 1-2]

According to the first example embodiment, the determination table T to be registered in the determination table storage unit 12 may include nine determination conditions; however, this is non-limiting. For example, according to Modification 1-2, the determination table T may further include flag information that indicates whether each of the nine determination conditions is enabled or disabled. FIG. 8 illustrates an example of the determination table T1 according to Modification 1-2. The following may be similarly applicable to the determination table T2. In this example, the determination table T1 may include nine determination conditions and nine flags. The respective nine flags may be associated with the nine determination conditions. The nine flags may each indicate whether the corresponding determination condition is enabled or disabled. In this example, "1" may indicate an enabled state, and "0 (zero)" may indicate a disabled state. In this example, the determination conditions for the services "IPv4", "IPv6", "Bonjour", "SNMP", "WindowsRally", "NBT", and "protocol ABC" may be set to "enabled", and the determination condition for the service "802.1X" may be set to "disabled". In this example, in a case where the network packet P meets at least one of the eight determination conditions set to "enabled" and included in the determination table T1 stored in the determination table storage unit 12, the packet processing unit 13 may generate the return command CMD of instructing switching from the sleep mode M2 to the normal mode M1. The flag may correspond to "enabled information" in one specific but non-limiting embodiment of the technology.

Figure 9:
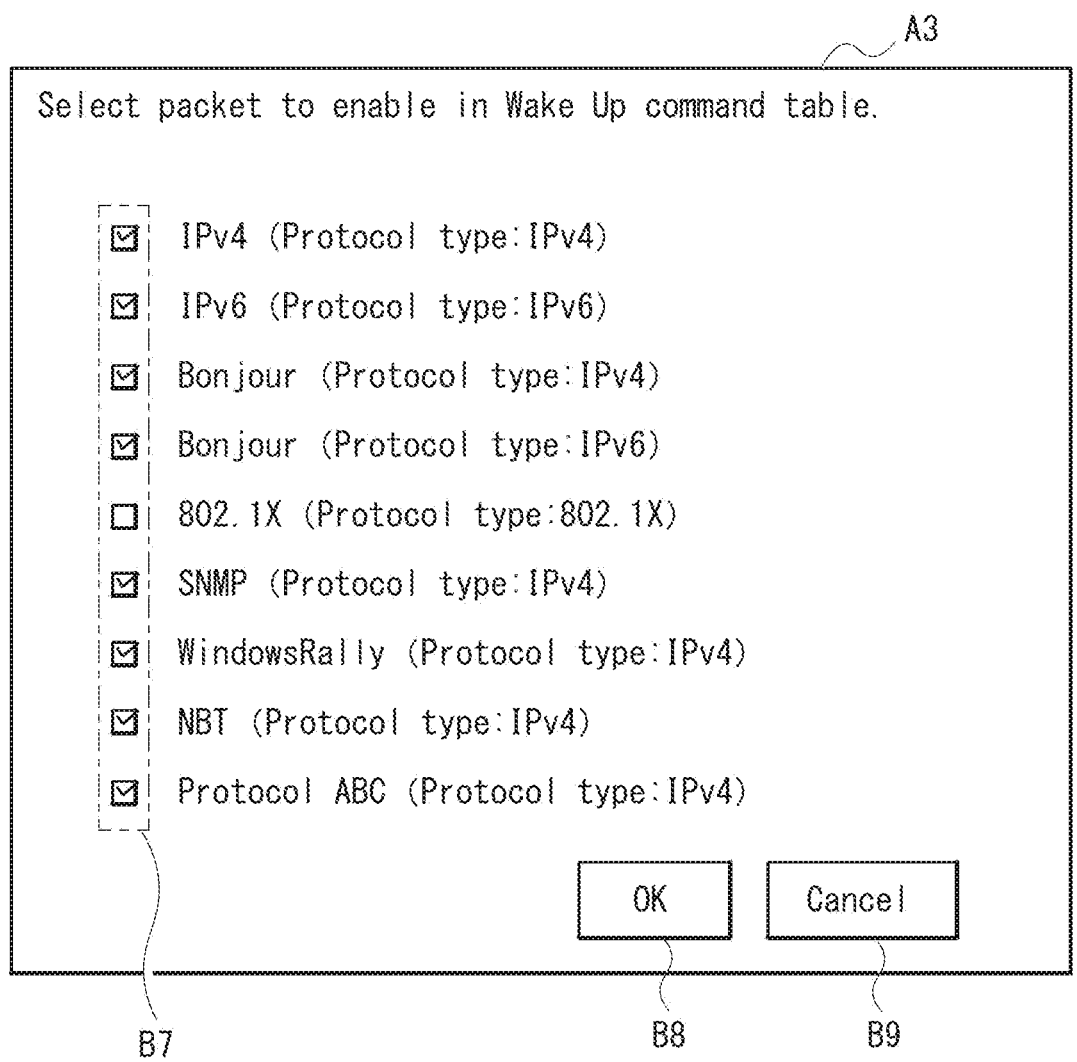
FIG. 9 is an explanatory diagram illustrating an example of a setting screen adapted to receive operation of setting the determination condition to be enabled or disabled in an image forming apparatus according to the other modification of the example embodiment.

The user may be allowed to enable or disable each of the nine determination conditions in the determination table T to be registered in the determination table storage unit 12, for example, with use of a setting screen A3 illustrated in FIG. 9. The setting screen A3 may include nine checkboxes B7, an OK button B8, and a cancel button B9. The nine checkboxes B7 may be adapted for the user to select the determination conditions to be "enabled" from the nine determination conditions. The OK button B8 may be operated by the user in a case where the user wishes to apply the setting displayed on the setting screen A3. The cancel button B9 may be operated by the user in a case where the user wishes to cancel the setting displayed on the setting screen A3.

In this example, the table registration unit 33 may first select the determination table T1 from the two determination tables T1 and T2 on the basis of the selection operation performed by the user on the setting screen A1 illustrated in FIG. 5, in a manner similar to that in the case of the first example embodiment. Thereafter, the display process unit 32 may generate setting screen information for the setting screen A3 illustrated in FIG. 9. In this example, because the determination table T1 has been selected by the user operation, descriptions of the nine determination conditions included in the determination table T1 may be displayed, as illustrated in FIG. 9. The user may operate, for example, the checkboxes B7, for example, with use of the operation unit 22 to thereby select the determination conditions to be "enabled". In this example, the determination conditions for the services "IPv4", "IPv6", "Bonjour", "SNMP", "WindowsRally", "NBT", and "protocol ABC" may be set to "enabled", and the determination condition for the service "802.1X" may be set to "disabled". The input process unit 31 may receive, on the setting screen A3, selection operation performed by the user. Further, the table registration unit 33 may register the nine determination conditions and the nine flags in the determination table storage unit 12 as the determination table T. The determination table T1 illustrated in FIG. 8 may be thus registered in the determination table storage unit 12.

In this example, the determination condition to be enabled or disabled may be identified on the basis of the nine flags; however, this is non-limiting. Alternatively, in one example, the determination condition to be enabled or disabled may be identified on the basis of information indicating the determination conditions to be enabled. In another example, the determination condition to be enabled or disabled may be identified on the basis of information indicating the determination conditions to be disabled.

2. Second Example Embodiment

Next, a description is given of an image forming apparatus 2 according to a second example embodiment of the technology. According to the second example embodiment, appropriateness of the determination table T selected by the user may be confirmed on the basis of history information of a network packet P received by the image forming apparatus 2. It is to be noted that component parts that are substantially the same as those of the image forming apparatus 1 according to the first example embodiment described above are denoted with the same numerals and may not be described further where appropriate.

Figure 10:
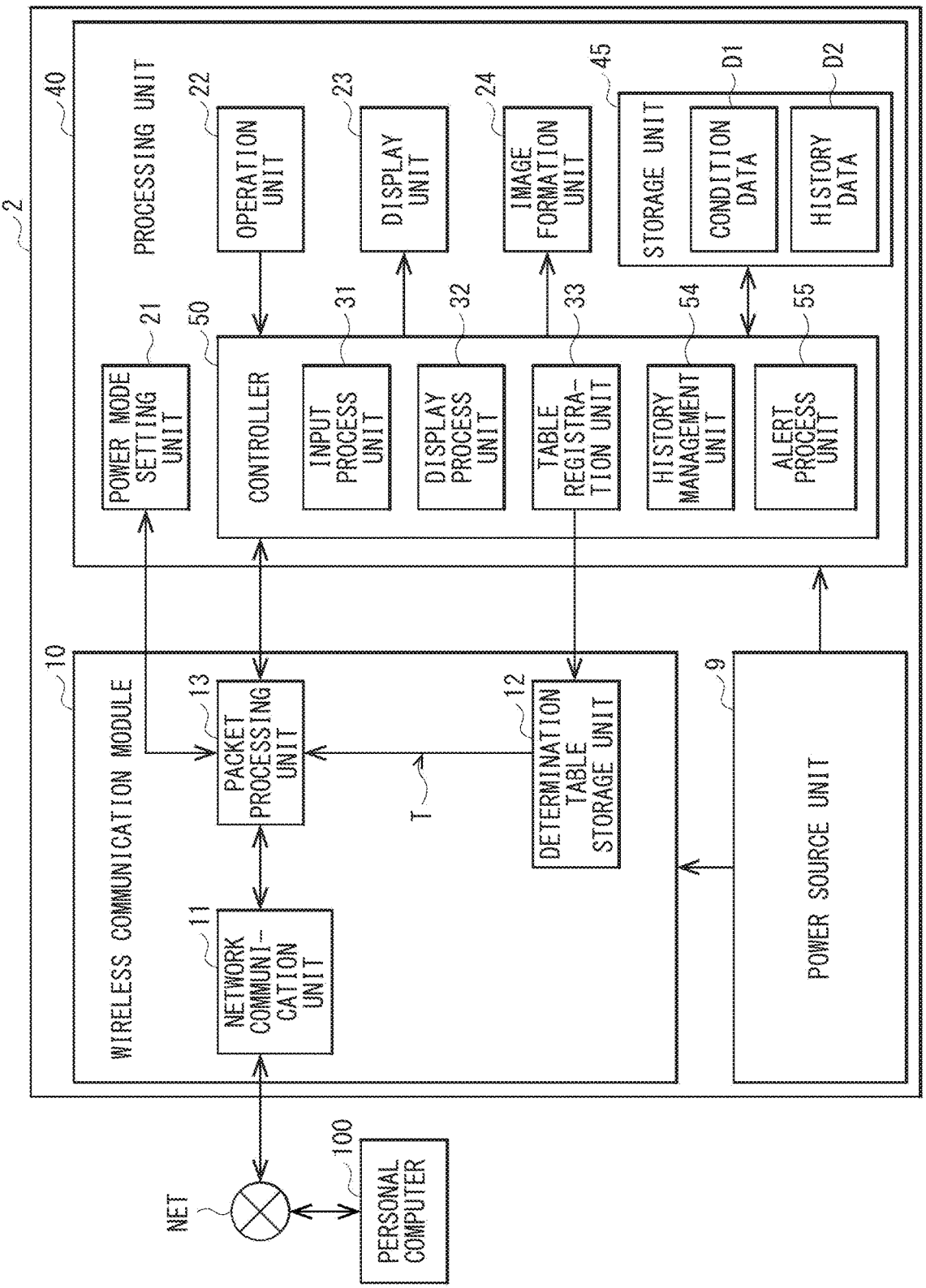
FIG. 10 is a block diagram illustrating an example of a configuration of an image forming apparatus according to one example embodiment of the technology.

FIG. 10 illustrates an example of a configuration of the image forming apparatus 2. The image forming apparatus 2 may include a processing unit 40. The processing unit 40 may include a controller 50 and a storage unit 45. The controller 50 may include a history management unit 54 and an alert process unit 55.

The history management unit 54 may manage a history of the network packet P received by the wireless communication module 10 in a case where the power mode M is the normal mode M1, with use of history data D2 stored in the storage unit 45.

The alert process unit 55 may decide a recommended determination table T on the basis of the history data D2. In a case where the determination table T selected by the user is different from the recommended determination table T, the alert process unit 55 may perform an alert process of alerting the user.

The storage unit 45 may store the history data D2. The history data D2 may include information related to a history of the network packet P received by the wireless communication module 10 in a case where the power mode M is the normal mode M1.

FIG. 11 illustrates an example of a configuration of the history data D2. In this example, the history data D2 may include information related to the number of times of reception of the IPv4 network packets P and the number of times of reception of the IPv6 network packets P in each service.

Figure 12:
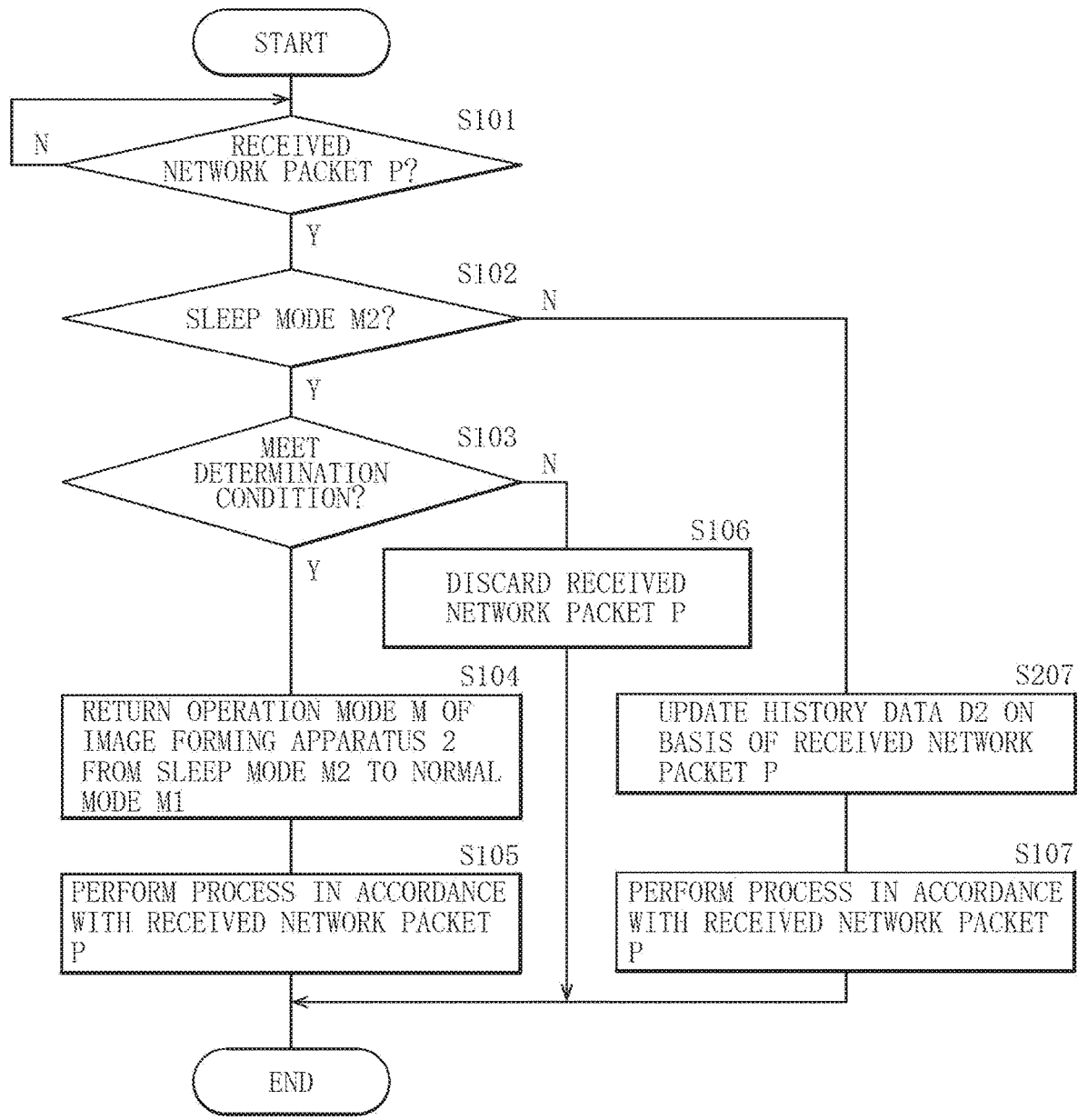
FIG. 12 is a flowchart illustrating an example of operation of the image forming apparatus illustrated in FIG. 10.

FIG. 12 illustrates an example of operation of the image forming apparatus 2. The respective processes in steps S101 to S107 may be similar to those in the case of the first example embodiment illustrated in FIG. 6.

In a case where the power mode M is the normal mode M1 in step S102 ("N" in step S102), the history management unit 54 may update the history data D2 on the basis of the network packet P received in step S101 (step S207).

Thereafter, the image forming apparatus 2 may perform a process in accordance with the network packet P received in step S101 (step S107). This may bring the flow to an end.

The alert process unit 55 may determine the recommended determination table T on the basis of the history data D2, and in a case where the determination table T selected by the user is different from the recommended determination table T, the alert process unit 55 may perform the alert process. In this example, the alert process unit 55 may confirm whether the determination table T selected by the user matches the recommended determination table T, for example: in a case (case C1) where the power mode M is to be switched from the normal mode M1 to the sleep mode M2; or in a case (case C2) where the user is to select the determination table T to be registered in the determination table storage unit 12. Detailed descriptions of the cases C1 and C2 are given below.

[Case C1]

Figure 13:
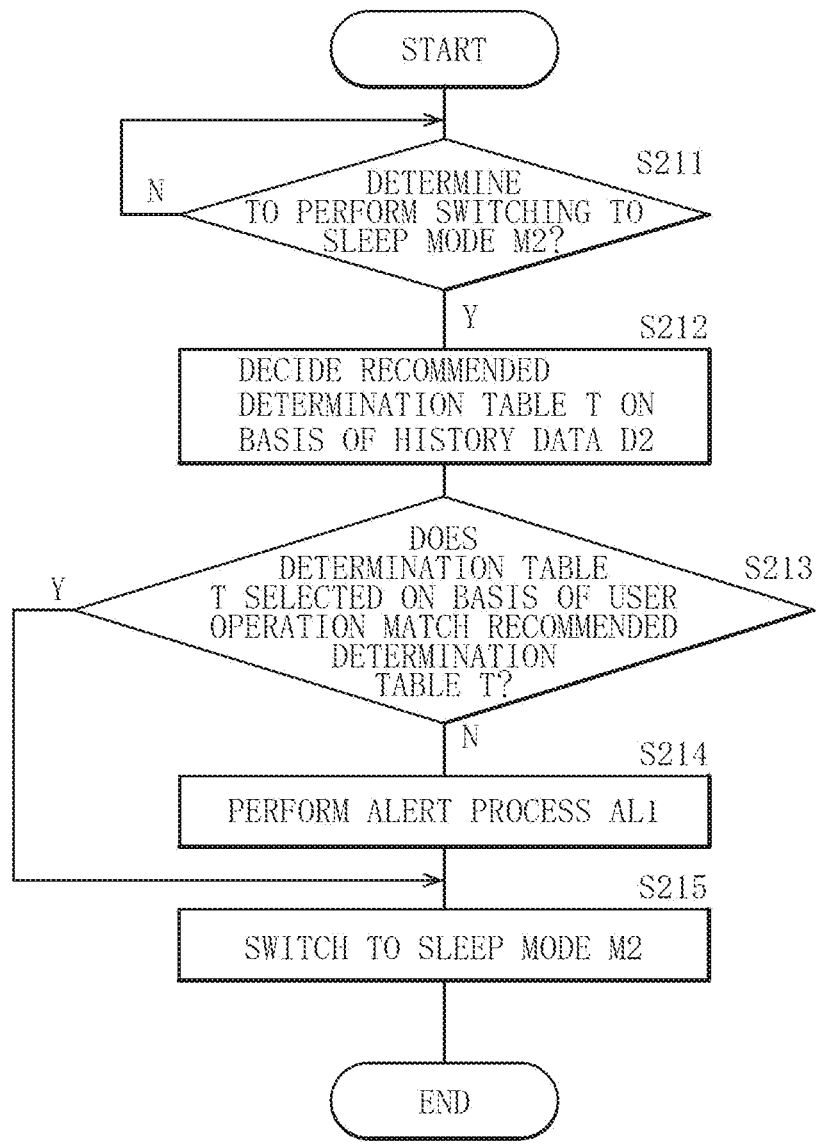
FIG. 13 is a flowchart illustrating an example of operation in a case of switching to a sleep mode in the image forming apparatus illustrated in FIG. 10.

FIG. 13 illustrates an example of operation of the image forming apparatus 2 in the case where the power mode M is to be switched from the normal mode M1 to the sleep mode M2.

First, the alert process unit 55 may confirm whether the power mode setting unit 21 has determined to perform switching from the normal mode M1 to the sleep mode M2 (step S211). The power mode setting unit 21 may determine to perform switching from the normal mode M1 to the sleep mode M2, for example, in a case where a predetermined time elapses after the image forming apparatus 2 performs the image formation operation in the normal mode M1. In a case where the power mode setting unit 21 has not determined to perform switching to the sleep mode M2 yet ("N" in step S211), the alert process unit 55 may repeat the process in step S211 until the power mode setting unit 21 determines to perform switching to the sleep mode M2.

In a case where the power mode setting unit 21 has determined to perform switching to the sleep mode M2 in S211 ("Y" in step S211), the alert process unit 55 may decide the recommended determination table T on the basis of the history data D2 (step S212). For example, in a case where a total value of the number of times of reception of the IPv4 network packets P is greater than a total value of the number of times of reception of the IPv6 network packets P in the history data D2, the alert process unit 55 may determine that the IPv4 communication is often performed in the network NET, and decide the determination table T1 to be the recommended determination table T. For example, in a case where the total value of the number of times of reception of the IPv6 network packets P is greater than the total value of the number of times of reception of the IPv4 network packets P in the history data D2, the alert process unit 55 may determine that the IPv6 communication is often performed in the network NET, and decide the determination table T2 to be the recommended determination table T.

Thereafter, the alert process unit 55 may confirm whether the determination table T selected on the basis of the user operation and registered in the determination table storage unit 12 matches the recommended determination table T decided in step S212 (step S213). The determination table T selected on the basis of the user operation may match the recommended determination table T, for example: in a case where the determination table T1 (Type 1) is registered in the determination table storage unit 12 and the determination table T1 (Type 1) is recommended; or in a case where the determination table T2 (Type 2) is registered in the determination table storage unit 12 and the determination table T2 (Type 2) is recommended. The determination table T selected on the basis of the user operation may not match the recommended determination table T, for example: in a case where the determination table T1 (Type 1) is registered in the determination table storage unit 12 and the determination table T2 (Type 2) is recommended; or in a case where the determination table T2 (Type 2) is registered in the determination table storage unit 12 and the determination table T1 (Type 1) is recommended. In a case where the determination table T selected on the basis of the user operation matches the recommended determination table T ("Y" in step S213), the alert process unit 55 may cause a process to proceed to step S215.

In a case where the determination table T selected on the basis of the user operation does not match the recommended determination table T in step S213 ("N" in step S213), the alert process unit 55 may perform an alert process AL1 (step S214).

FIG. 14 illustrates an example of the alert process AL1. In this example, the alert process unit 55 may perform an alert process to thereby cause the wireless communication module 10 to send an e-mail including an alert message to an e-mail address of a manager of the image forming apparatus 2. The e-mail address of the manager of the image forming apparatus 2 may be registered in the image forming apparatus 2 in advance. The alert message may include information related to the history data D2 illustrated in FIG. 11 in this example.

In this example, the determination table T2 (Type 2) may be registered in the determination table storage unit 12. In the history data D2, the total value of the number of times of reception of the IPv4 network packets P may be 23 (=3+8+10+2), and the total value of the number of times of reception of the IPv6 network packets P may be 10 (=4+5+1+0). Accordingly, the alert process unit 55 may determine that the IPv4 communication is often performed in the network NET, and decide the determination table T1 (Type 1) to be the recommended determination table T. In this case, the determination table T2 (Type 2) selected on the basis of the user operation may not match the recommended determination table T1 (Type 1). Accordingly, the alert message may include a message that suggests changing the determination table T in the determination table storage unit 12 to the determination table T1 (Type 1).

Note that, in this example, an e-mail may be used to alert the user; however, this is non-limiting. In one example, the display unit 23 may display an alert message. In another example, the display unit of the personal computer 100 may display an alert message.

Thereafter, the power mode setting unit 21 may switch the power mode M from the normal mode M1 to the sleep mode M2 (step S215).

This may bring the flow to an end.

[Case C2]

Figure 15:
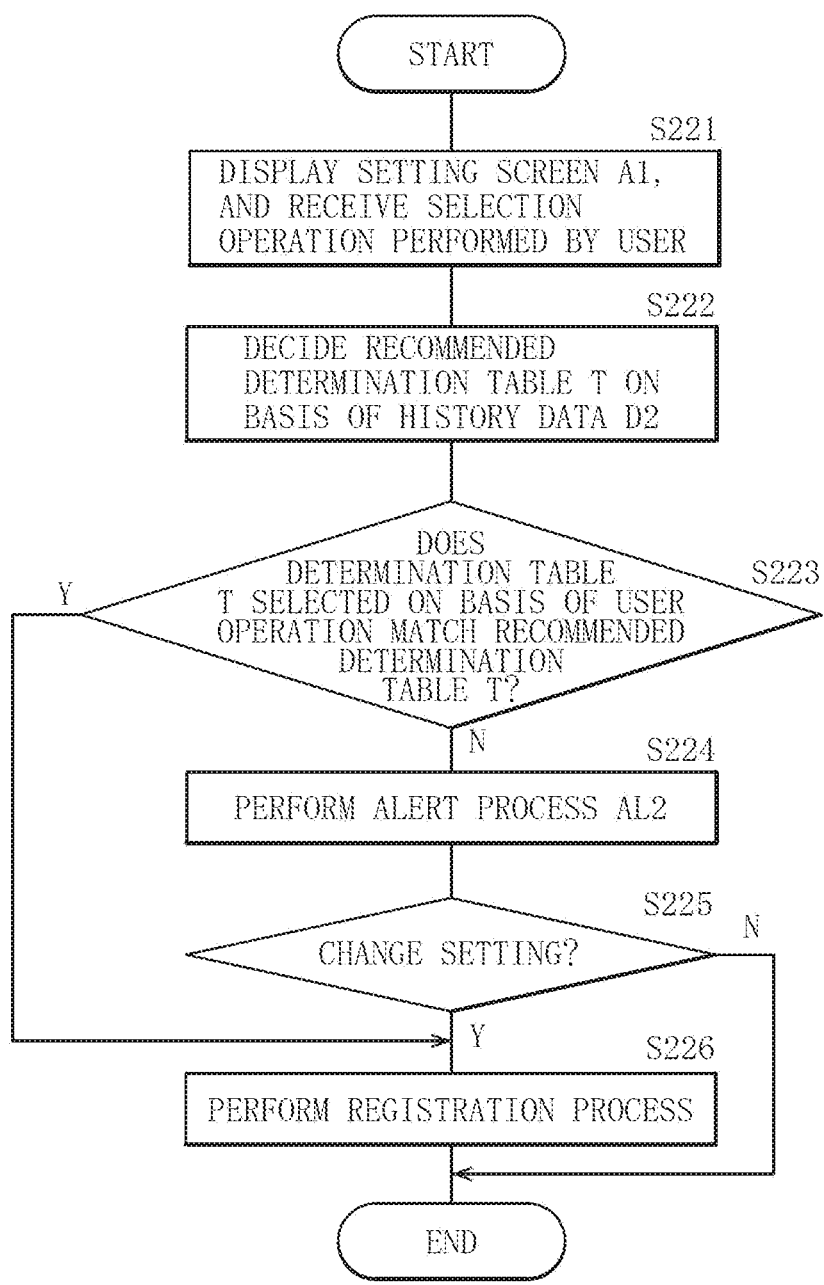
FIG. 15 is a flowchart illustrating an example of operation in a case of registering the determination table in the image forming apparatus illustrated in FIG. 10.

FIG. 15 illustrates an example of operation of the image forming apparatus 2 in a case where the user is to select the determination table T to be registered in the determination table storage unit 12.

First, the image forming apparatus 2 may receive the selection operation of the user performed on the setting screen A1 illustrated in FIG. 5 (step S221).

Thereafter, the alert process unit 55 may decide the recommended determination table T on the basis of the history data D2 (step S222).

Thereafter, the alert process unit 55 may confirm whether the determination table T selected on the basis of the user operation in step S221 matches the determination table T recommended in step S222 (step S223). In a case where the determination table T selected on the basis of the user operation matches the recommended determination table T ("Y" in step S223), the alert process unit 55 may cause the process to proceed to step S226.

In a case where the determination table T selected on the basis of the user operation does not match the recommended determination table T in step S223 ("N" in step S223), the alert process unit 55 may perform an alert process AL2 (step S224).

Figure 16:
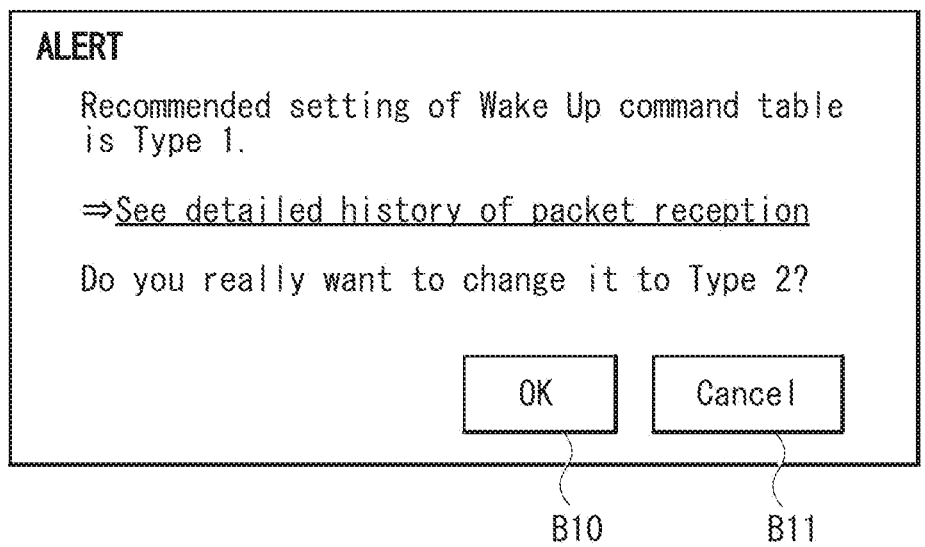
FIG. 16 is an explanatory diagram illustrating an example of an alert process illustrated in FIG. 15.

FIG. 16 illustrates an example of the alert process AL2. In this example, the alert process unit 55 may perform an alert process to thereby cause the display unit of the personal computer 100 to display an alert message. In this example, the determination table T2 (Type 2) may have been selected as the determination table T to be registered in the determination table storage unit 12 by the user operation performed in step S221. Further, the alert process unit 55 may determine that the IPv4 communication is often performed in the network NET, and decide the determination table T1 (Type 1) to be the recommended determination table T in this example. That is, the determination table T2 (Type 2) selected on the basis of the user operation may not match the recommended determination table T1 (Type 1). Accordingly, the alert message may include a message that the recommended setting is Type 1 and a message that confirms whether the user really wishes to change the determination table T to Type 2. In this example, in a case where the user operates the part that says, "See detailed history of packet reception", the display unit of the personal computer 100 may display information related to the history data D2 illustrated in FIG. 11. The OK button B10 may be operated by the user in a case where the user wishes to change the setting by the selection operation performed in step S221. The cancel button B11 may be operated by the user in a case where the user wishes to cancel the change in the setting.

The user may operate the OK button B10 or the cancel button B11, for example, by operating the operation unit of the personal computer 100. The input process unit 31 of the image forming apparatus 2 may receive this user operation.

Thereafter, the alert process unit 55 may confirm whether the input process unit 31 has received operation indicating to change the setting (step S225). The operation performed on the OK button B10 may serve as the operation indicating to change the setting, and the operation performed on the cancel button B11 may serve as the operation indicating to cancel the change in the setting. In a case where the input process unit 31 receives the operation indicating to cancel the change in the setting ("N" in step S225), this flow may be brought to an end.

In a case where the input process unit 31 receives the operation indicating to change the setting in step S225 ("Y" in step S225), the table registration unit 33 may register the determination table T in accordance with the selection operation received in step S221 in the determination table storage unit 12 (step S226).

This may bring the flow to an end.

As described above, in the image forming apparatus 2, one of the two determination tables T1 and T2 may be decided as the recommended determination table T on the basis of the history data D2. In the case where the determination table T selected by the selection operation performed by the user and the recommended determination table T do not match each other, the alert process may be performed. This allows the image forming apparatus 2 to determine which of the IPv4 communication and the IPv6 communication is often performed in the network NET on the basis of the history data D2, and to thereby determine which of the determination tables T1 and T2 is appropriate. For example, in the case where the IPv4 communication is often performed in the network NET and where the user selects the determination table T2 corresponding to IPv6, the image forming apparatus 2 may be able to alert the user, for example, that the user should select the determination table T1 corresponding to IPv4. As a result, in the image forming apparatus 2, it is possible to register the determination condition, for example, suitable for the use environment of the image forming apparatus 2. It is therefore possible to effectively reduce electric power consumption.

That is, for example, in a case where the determination table T1 (Type 1) has been registered in the determination table storage unit 12 on the basis of the selection operation performed by the user and where, for example, the network communication unit 11 receives the SNMP network packet P having the protocol type of IPv6, the received network packet P may be discarded. If the received network packet P is actually unnecessary, the process of discarding the network packet P may be appropriate in terms of electric power saving; however, the received network packet P can be actually necessary in some cases. Further, if the manager has little knowledge about the network, it may be difficult to for him or her to immediately solve such an issue. In the image forming apparatus 2, one of the two determination tables T1 and T2 may be decided as the recommended determination table T on the basis of the history data D2. Accordingly, in the image forming apparatus 2, it is possible to register the determination condition, for example, suitable for the use environment of the image forming apparatus 2. It is therefore possible to effectively reduce electric power consumption.

As described above, according to the second example embodiment, one of two determination tables may be decided as a recommended determination table on the basis of history data. In a case where the determination table selected by selection operation performed by a user and the recommended determination table do not match each other, an alert process may be performed. It is therefore possible to effectively reduce electric power consumption. Other effects may be similar to those of the first example embodiment.

[Modification 2-1]

According to the second example embodiment, the history data D2 may include the information related to the number of times of reception of the IPv4 network packets P and the number of times of reception of the IPv6 network packets P in each service; however, this is non-limiting. Alternatively, for example, according to Modification 2-1, the history data D2 may include information related to whether the IPv4 network packet P has been received in the past and information related to whether the IPv6 network packet P has been received in the past for each service.

[Modification 2-2]

Any of the modifications of the first example embodiment may be applied to the image forming apparatus 2 according to the second example embodiment.

3. Third Example Embodiment

Next, a description is given of an image forming apparatus 3 according to a third example embodiment of the technology. It is to be noted that component parts that are substantially the same as those of the image forming apparatus 1 according to the first example embodiment described above are denoted with the same numerals and may not be described further where appropriate.

Figure 17:
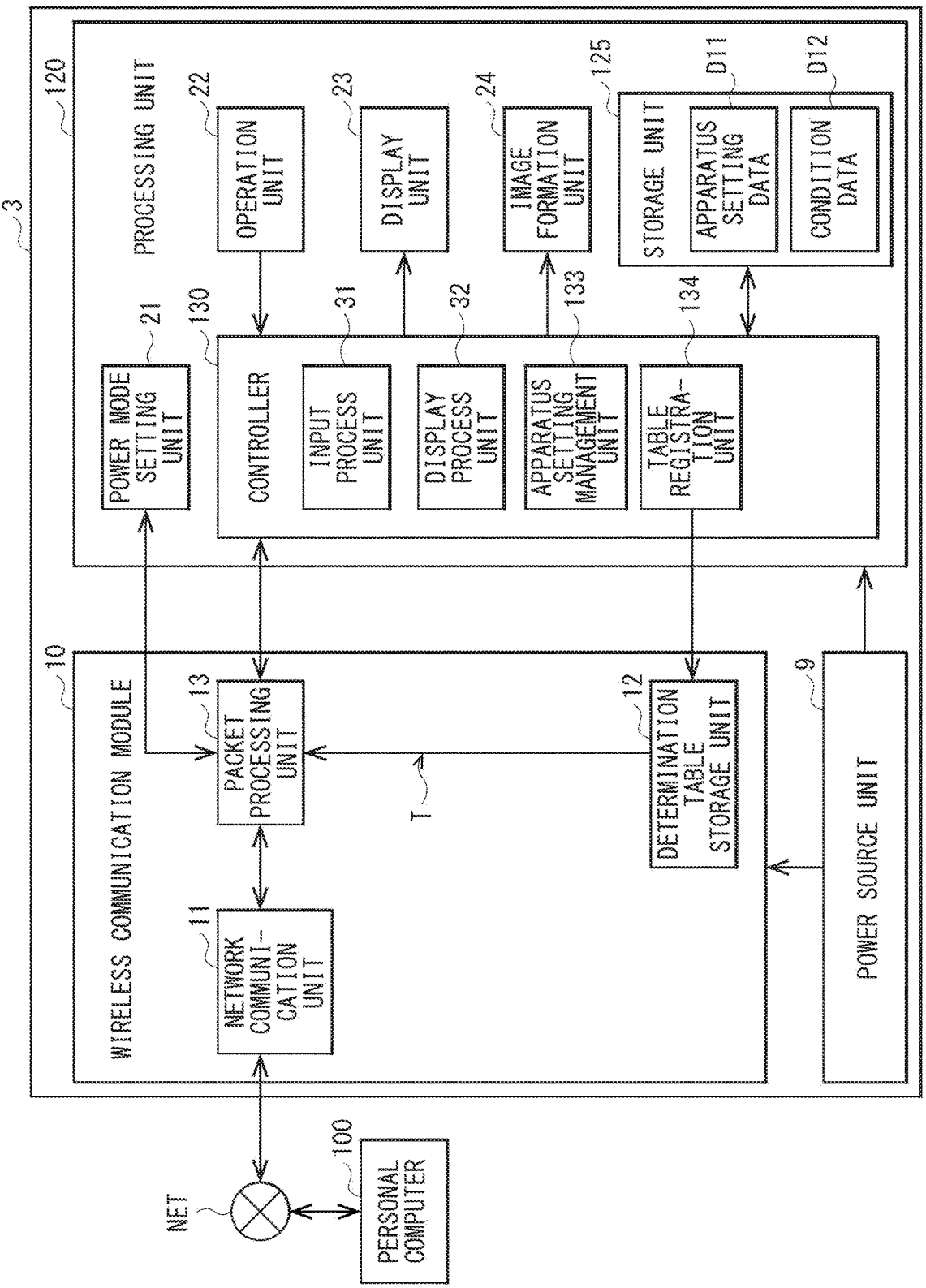
FIG. 17 is a block diagram illustrating an example of a configuration of an image forming apparatus according to one example embodiment of the technology.

FIG. 17 illustrates an example of a configuration of the image forming apparatus 3. The image forming apparatus 3 may include a processing unit 120. The processing unit 120 may include a storage unit 125 and a controller 130.

The storage unit 125 may store apparatus setting data D11 and condition data D12.

The apparatus setting data D11 may include various kinds of setting information of the image forming apparatus 3. The apparatus setting data D11 may include, for example but not limited to, setting information related to the image formation unit 24 and setting information related to the wireless communication module 10 such as a communication protocol or the determination table T.

The condition data D12 may include information related to the determination conditions to be registered in the determination table storage unit 12. The condition data D12 may be used when a table registration unit 134 of the controller 130 registers the determination table T in the determination table storage unit 12. The table registration unit 134 will be described later.

FIG. 18 illustrates an example of the condition data D12. The condition data D12 may include information related to a plurality of determination conditions. The condition data D12 may also include information, for each of the determination conditions, indicating which of predetermined two determination tables T (the determination tables T1 and T2) the determination condition is to be included in. The determination table T1 may be favorably used in a case where the network NET which the image forming apparatus 3 is coupled to mainly carries the IPv4 network packet P. The determination table T2 may be favorably used in a case where the network NET which the image forming apparatus 3 is coupled to mainly carries the IPv6 network packet P. For example, the determination condition with "Yes" in the "T1" column may be the determination condition to be included in the determination table T1, and the determination condition with "Yes" in the "T2" column may be the determination condition to be included in the determination table T2.

FIG. 19 illustrates an example of the determination table T1. FIG. 20 illustrates an example of the determination table T2. The determination tables T1 and T2 may each include nine determination conditions in this example.

Referring to the determination table T1 illustrated in FIG. 19, for example, the determination condition for the service "IPv4" may be that: the protocol type is IPv4; and the destination MAC address is a MAC address of the image forming apparatus 3. The determination condition for the service "IPv6" may be that: the protocol type is IPv6; and the destination MAC address is the MAC address of the image forming apparatus 3. The determination condition for the service "802.1X" may be that the protocol type is 802.1X. The determination table T1 may include two determination conditions for the service "Bonjour". A first determination condition for the service "Bonjour" may be that: the protocol type is IPv4; the protocol kind is UDP; the destination port number is 5353; and the destination IP address is 224.0.0.251. This destination IP address may be a multicast address. A second determination condition for the service "Bonjour" may be that: the protocol type is IPv6; the protocol kind is UDP; the destination port number is 5353; and the destination IP address is [FF02: :FB]. This destination IP address may be a multicast address. The determination condition for the service "SNMP" may be that: the protocol type is IPv4; the protocol kind is UDP; and the destination port number is 161. The determination condition for the service "WindowsRally" may be that: the protocol type is IPv4; the protocol kind is UDP; and the destination port number is 3702. The determination condition for the service "NBT" may be that: the protocol type is IPv4; the protocol kind is UDP; and the NBNS data is the NetBIOS name of the image forming apparatus 3. A protocol ABC may be an original protocol developed by a manufacturer of the image forming apparatus 3, for example. The determination condition for the service "protocol ABC" may be that: the protocol type is IPv4; the protocol kind is UDP; and the destination port number is a predetermined number ("XXXX" in FIG. 18).

As described above, the determination condition may be set as a combination of any of, for example but not limited to, the protocol type, the destination MAC address, the protocol kind, the destination port number, and the destination IP address.

The determination table T1 may be favorably used in the case where the image forming apparatus 3 is coupled to a network that mainly carries the IPv4 network packet P, as described above. However, the determination table T1 may also include some determination conditions in which the protocol type is IPv6, for example, as the determination conditions for the services "IPv6" and "Bonjour". Moreover, the two determination conditions for the service "Bonjour" may include the determination condition related to IPv4 and the determination condition related to IPv6.

In the determination table T2 illustrated in FIG. 20, for example, the respective determination conditions for the services "IPv4", "IPv6", "802.1X", and "Bonjour" may be similar to those in the determination table T1 illustrated in FIG. 19. The determination conditions for the services "SNMP", "WindowsRally", "NBT", and "protocol ABC" may be similar to those for the services "SNMP", "WindowsRally", "NBT", and "protocol ABC" in the determination table T1 illustrated in FIG. 19, respectively, except for that the protocol type is changed from IPv4 to IPv6.

The determination table T2 may be favorably used in the case where the image forming apparatus 3 is coupled to a network that mainly carries the IPv6 network packet P, as described above. However, the determination table T2 may also include some determination conditions in which the protocol type is IPv4, for example, as the determination conditions for the services "IPv4" and "Bonjour".

The controller 130 may include an apparatus setting management unit 133 and the table registration unit 134.

The apparatus setting management unit 133 may manage the various kinds of setting information of the image forming apparatus 3 with use of the apparatus setting data D11 stored in the storage unit 125.

The table registration unit 134 may register a plurality of determination conditions included in the determination table T on the basis of the apparatus setting data D11 and with use of the condition data D12. The table registration unit 134 may thereby register the determination table T in the determination table storage unit 12 of the wireless communication module 10.

With this configuration, in the image forming apparatus 3, the determination conditions to be registered in the determination table storage unit 12 may be selected on the basis of the apparatus setting data D11. This allows for effective reduction of electric power consumption in the image forming apparatus 3. That is, in a case of constantly using the single determination table T, it is difficult to set many determination conditions because of the limited memory capacity, for example. In such a case, it is difficult to cover all of the services that may be necessary, making it difficult to effectively reduce electric power consumption. In the image forming apparatus 3, the determination conditions to be registered in the determination table storage unit 12 may be selected on the basis of the apparatus setting data D11. This may exclude, for example, the determination condition for the service which the user does not use from the determination conditions to be registered in the determination table T in the image forming apparatus 3, as will be described later. It is therefore possible to effectively reduce electric power consumption.

The apparatus setting management unit 133 may correspond to a "setting unit" in one specific but non-limiting embodiment of the technology. The table registration unit 134 may correspond to the "registration unit" in one specific but non-limiting embodiment of the technology.

The image forming apparatus 3 may first set whether the network NET which the image forming apparatus 3 is coupled to is the network that mainly carries the IPv4 network packet P or the network that mainly carries the IPv6 network packet P, on the basis of the user operation.

For example, when the user operates the operation unit 22, the input process unit 31 of the controller 130 may receive the user operation. The display process unit 32 may generate menu screen information adapted to configure setting of the image forming apparatus 3, on the basis of the received user operation. The display unit 23 may display a menu screen on the basis of the generated menu screen information. The user may perform operation on the operation unit 22 while seeing the displayed menu screen. The input process unit 31 may receive the user operation thus performed by the user. Further, the display process unit 32 may generate setting screen information for the determination table T, and the display unit 23 may display a setting screen A101 on the basis of the generated setting screen information.

Figure 21:
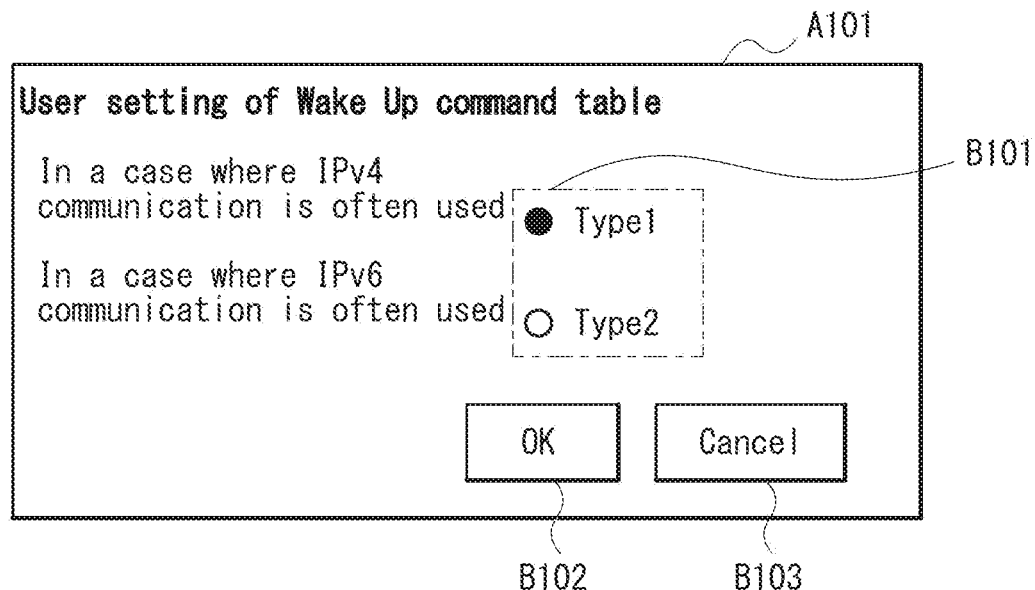
FIG. 21 is an explanatory diagram illustrating an example of a setting screen adapted to receive selection operation for the determination table.

FIG. 21 illustrates an example of the setting screen A101. The setting screen A101 may include a radio button B101, an OK button B102, and a cancel button B103. The radio button B101 may allow the user to select which of the IPv4 communication and the IPv6 communication is often performed in the network NET which the image forming apparatus 3 is coupled to. The radio button B101 may include two radio buttons, and the user may select one of the two radio buttons. In a case where the IPv4 communication is often performed, the user may operate the radio button related to "Type 1". In a case where the IPv6 communication is often performed, the user may operate the radio button related to "Type 2". The OK button B102 may be operated by the user in a case where the user wishes to apply the setting displayed on the setting screen A101. The cancel button B103 may be operated by the user in a case where the user wishes to cancel the setting displayed on the setting screen A101.

The input process unit 31 may receive selection operation performed by the user on the setting screen A101. The apparatus setting management unit 133 may update the apparatus setting data D11 on the basis of the received selection operation. For example, in a case where the user has selected the radio button related to "Type 1" of the radio button B101, the IPv4 communication may be often performed in the network NET. Therefore, the apparatus setting management unit 133 may set, in the apparatus setting data D11, information indicating that the determination table T1 is selected. In a case where the user has selected the radio button related to "Type 2", the IPv6 communication may be often performed in the network NET. Therefore, the apparatus setting management unit 133 may set, in the apparatus setting data D11, information indicating that the determination table T2 is selected.

Although the user may operate the operation unit 22 in the example described above, this is non-limiting. In another example, the user may operate an operation unit of the personal computer 100 that performs communication with the image forming apparatus 3. In this example, when the user operates the operation unit of the personal computer 100, the input process unit 31 of the image forming apparatus 3 may receive the operation performed by the user via the wireless communication module 10. Further, the display process unit 32 may generate the setting screen information for the determination table T, and the wireless communication module 10 may transmit the generated setting screen information to the personal computer 100. The display unit of the personal computer 100 may display a setting screen such as that illustrated in FIG. 21 on the basis of the received setting screen information. When the user performs selection operation on the displayed setting screen, the input process unit 31 of the image forming apparatus 3 may receive the selection operation performed by the user. The apparatus setting management unit 133 may update the apparatus setting data D11 on the basis of the received selection operation.

Further, the image forming apparatus 3 may set whether to enable or disable each of a plurality of communication protocols, on the basis of the user operation.

For example, when the user operates the operation unit 22, the input process unit 31 of the controller 130 may receive the user operation. The display process unit 32 may generate menu screen information adapted to configure setting of the image forming apparatus 3, on the basis of the user operation. The display unit 23 may display a menu screen on the basis of the generated menu screen information. The user may perform operation on the operation unit 22 while seeing the displayed menu screen. The input process unit 31 may receive the user operation thus performed by the user. Further, the display process unit 32 may generate setting screen information for the communication protocols, and the display unit 23 may display a setting screen A102 on the basis of the generated setting screen information.

Figure 22:
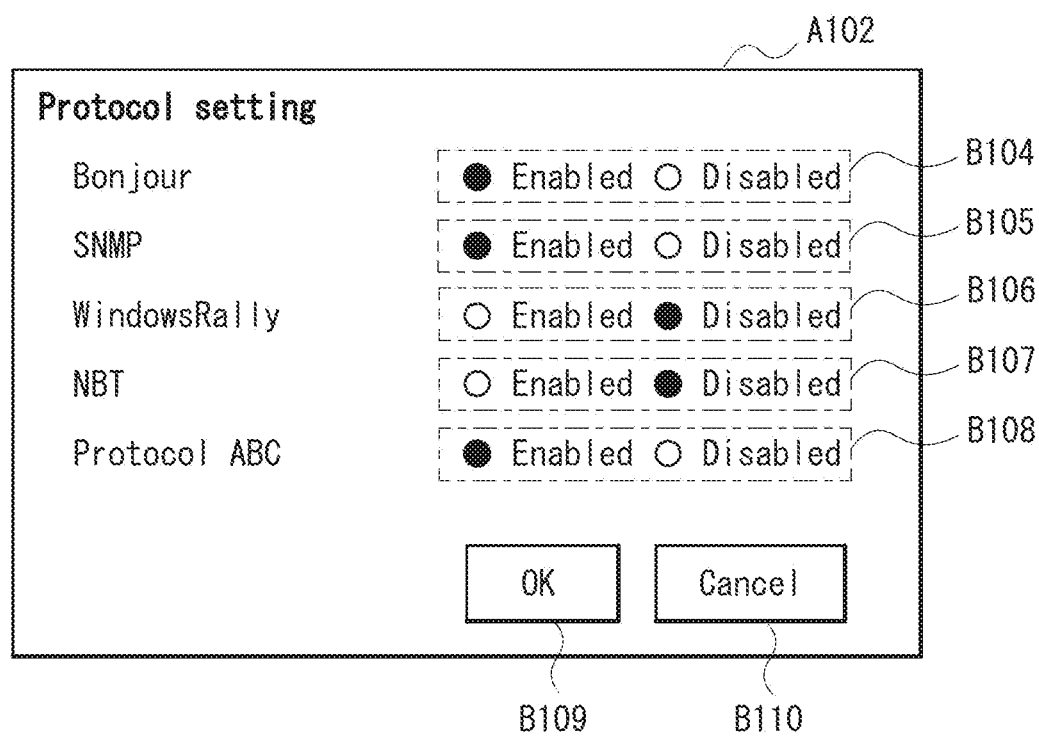
FIG. 22 is an explanatory diagram illustrating an example of a setting screen adapted to receive selection operation for a communication protocol.

FIG. 22 illustrates an example of the setting screen A102. The setting screen A102 may include radio buttons B104 to B108, an OK button B109, and a cancel button B110. The radio buttons B104 to B108 may each include two radio buttons. The radio button B104 may be operated by the user in a case where the user sets the communication protocol of the service "Bonjour" to be enabled or disabled. The radio button B105 may be operated by the user in a case where the user sets the communication protocol of the service "SNMP" to be enabled or disabled. The radio button B106 may be operated by the user in a case where the user sets the communication protocol of the service "WidowsRally" to be enabled or disabled. The radio button B107 may be operated by the user in a case where the user sets the communication protocol of the service "NBT" to be enabled or disabled. The radio button B108 may be operated by the user in a case where the user sets the communication protocol of the service "protocol ABC" to be enabled or disabled. The OK button B109 may be operated by the user in a case where the user wishes to apply the setting displayed on the setting screen A102. The cancel button B110 may be operated by the user in a case where the user wishes to cancel the setting displayed on the setting screen A102.

The input process unit 31 may receive selection operation performed by the user on the setting screen A102. The apparatus setting management unit 133 may update the apparatus setting data D11 on the basis of the received selection operation. For example, in a case where the user has selected the radio button related to "enabled" of the radio button B104, the apparatus setting management unit 133 may set, in the apparatus setting data D11, information indicating that the communication protocol of the service "Bonjour" is enabled. In a case where the user has selected the radio button related to "disabled", the apparatus setting management unit 133 may set, in the apparatus setting data D11, information indicating that the communication protocol of the service "Bonjour" is disabled. This may be similarly applicable to each of the radio buttons B105 to B108.

In this example, the setting for the plurality of communication protocols may be performed together with use of the single setting screen A102, as illustrated in FIG. 22; however, this is non-limiting. Alternatively, in one example, the setting for the communication protocols may be performed with use of a plurality of setting screens.

Moreover, in this example, each of the communication protocols may be directly set to be enabled or disabled; however, this is non-limiting. Alternatively, in one example, each of the communication protocols may be indirectly set to be enabled or disabled. For example, enabling of one function may cause enabling of one or more communication protocols related to the function, and disabling of the function may cause disabling of the one or more communication protocols related to the function.

Thereafter, the table registration unit 134 may register the determination table T in the determination table storage unit 12 of the wireless communication module 10 on the basis of the apparatus setting data D11 and the condition data D12 stored in the storage unit 125 every time when the power mode M of the image forming apparatus 3 is switched from the normal mode M1 to the sleep mode M2.

Figure 23:
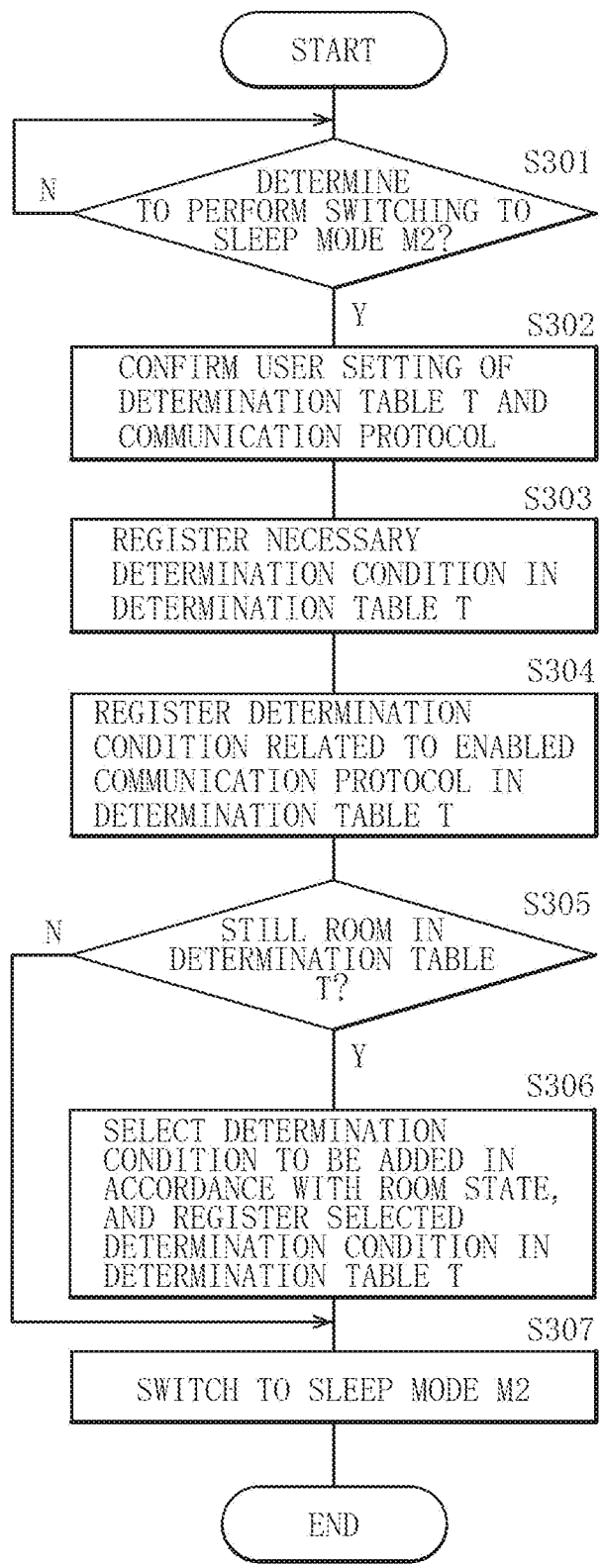
FIG. 23 is a flowchart illustrating an example of operation of the image forming apparatus illustrated in FIG. 17.

FIG. 23 illustrates an example of registration operation for the determination table T of the image forming apparatus 3.

First, the table registration unit 134 may confirm whether the power mode setting unit 21 has determined to perform switching from the normal mode M1 to the sleep mode M2 (step S301). The power mode setting unit 21 may determine to perform switching from the normal mode M1 to the sleep mode M2, for example, in a case where a predetermined time elapses after the image forming apparatus 3 performs the image formation operation in the normal mode M1. In a case where the power mode setting unit 21 has not determined to perform switching to the sleep mode M2 yet ("N" in step S301), the table registration unit 134 may repeat the process in step S301 until the power mode setting unit 21 determines to perform switching to the sleep mode M2.

In a case where the power mode setting unit 21 has determined to perform switching to the sleep mode M2 ("Y" in step S301), the table registration unit 134 may confirm user setting related to the determination table T and the communication protocol on the basis of the apparatus setting data D11 stored in the storage unit 125 (step S302). For example, the table registration unit 134 may confirm: information related to which of the determination tables T1 and T2 has been selected on the setting screen A101 illustrated in FIG. 21; and information related to whether each of the services "Bonjour", "SNMP", "WidowsRally", "NBT", and "protocol ABC" is set to be enabled or disabled on the setting screen A102 illustrated in FIG. 22.

Thereafter, the table registration unit 134 may register determination conditions that may be necessary in the determination table T (step S303), and may register determination conditions for the enabled communication protocols in the determination table T (step S304). Further, the table registration unit 134 may confirm whether the determination table T still has room for the determination conditions (step S305). In a case where the determination table T has no room ("N" in step S305), the table registration unit 134 may cause the process to proceed to step S307. In a case where the determination table T still has room ("Y" in step S305), the table registration unit 134 may select a determination condition to be added in accordance with the state of the room, and register the selected determination condition in the determination table T (step S306). Thereafter, the table registration unit 134 may cause the process to proceed to step S307.

A detailed description is given below of the respective processes in steps S303 to S306 in a case where the determination table T1 (Type 1) has been selected on the setting screen A101 illustrated in FIG. 21, and where the services "Bonjour", "SNMP", and "protocol ABC" have been set to be enabled on the setting screen A102 illustrated in FIG. 22.

FIG. 24 illustrates an example of the selected determination table T1 and information related to the setting of the communication protocols. In this example, the services "Bonjour", "SNMP", and "protocol ABC" may be set to be enabled, and the services "WindowsRally" and "NBT" may be set to be disabled.

In this example, the services "IPv4", "IPv6", and "802.1X" may be the communication protocols which may be necessary for the image forming apparatus 3. Therefore, the user may not be allowed to set the three services to be disabled. Accordingly, the table registration unit 134 may register the respective determination conditions for the three services in the determination table T as the determination conditions which may be necessary (step S303). Thus, three determination conditions may be registered in the determination table T, as illustrated in FIG. 25.

In this example, the services "Bonjour", "SNMP", and "protocol ABC" may be set to be enabled, as illustrated in FIG. 24. Accordingly, the table registration unit 134 may register the respective determination conditions for these services in the determination table T (step S304). Thus, seven determination conditions in total may be registered in the determination table T, as illustrated in FIG. 26.

In this example, the determination table T may be allowed to include nine or less determination conditions, and the determination table T may include seven determination conditions in FIG. 26. Accordingly, the determination table T may still have room ("Y" in step S305), and the table registration unit 134 may select two determination conditions to be added in the determination table T (step S306). In this example, the table registration unit 134 may select two determination conditions to be added to the determination table T from the determination conditions included in the determination table T2 which has not been selected.

FIG. 27 illustrates an example of the determination table T2 and information related to the setting of the communication protocols. In this example, the services "Bonjour", "SNMP", and "protocol ABC" may be set to be enabled, and the services "WindowsRally" and "NBT" may be set to be disabled, as in FIG. 24.

The respective determination conditions for the services "IPv4", "IPv6", "802.1X", and "Bonjour" in the determination table T2 may be similar to those in the determination table T1. The services "WindowsRally" and "NBT" may be set to be disabled. Accordingly, the table registration unit 134 may select the respective determination conditions for the services "SNMP" and "protocol ABC" as the determination conditions to be added, and register these determination conditions in the determination table T. Thus, nine determination conditions may be registered in the determination table T, as illustrated in FIG. 28.

The table registration unit 134 may thus register the determination conditions in the determination table T.

Thereafter, the power mode setting unit 21 may switch the power mode M from the normal mode M1 to the sleep mode M2 (step S307).

This may bring the flow to an end.

The determination table T may be thus registered in the determination table storage unit 12 of the wireless communication module 10. Thereafter, upon receiving a network packet P in the case where the power mode M is the sleep mode M2, the image forming apparatus 3 may confirm whether the received network packet P meets at least one of the plurality of determination conditions included in the determination table T stored in the determination table storage unit 12. In a case where the network packet P meets at least one of the determination conditions, the image forming apparatus 3 may switch the power mode M from the sleep mode M2 to the normal mode M1. This operation is described in detail below.

Figure 29:
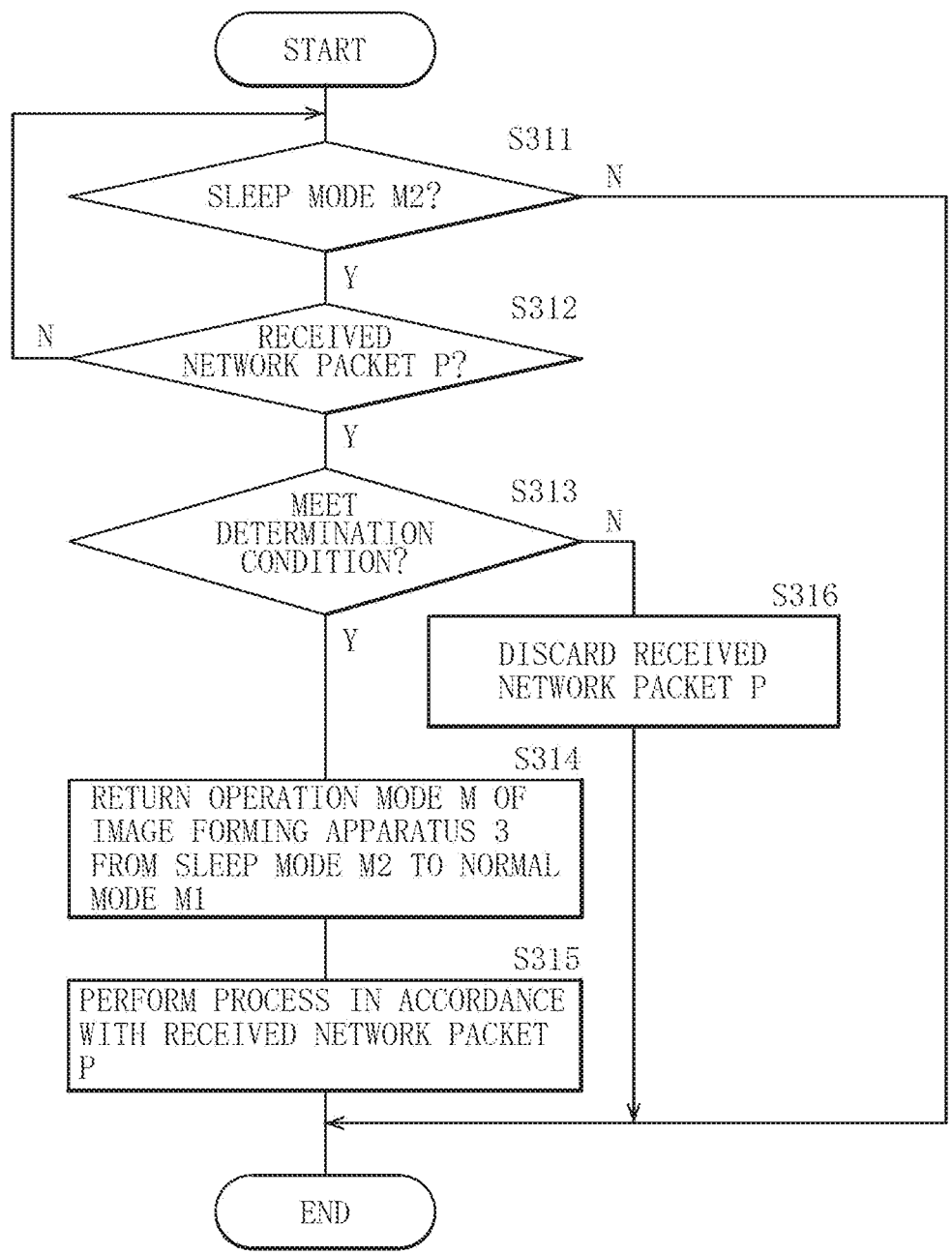
FIG. 29 is another flowchart illustrating an example of the operation of the image forming apparatus illustrated in FIG. 17.

FIG. 29 illustrates an example of operation of the image forming apparatus 3.

First, the packet processing unit 13 may confirm whether the power mode M is the sleep mode M2 (step S311). In a case where the power mode M is the normal mode M1 ("N" in step S311), the flow may be brought to an end. In a case where the power mode M is the sleep mode M2 in step S311 ("Y" in step S311), the packet processing unit 13 may confirm whether the network communication unit 11 has received a network packet P (step S312). In a case where the network communication unit 11 has not received the network packet P yet ("N" in step S312), the packet processing unit 13 may return the process to step S311, and repeat the processes in steps S311 and S312 until the power mode M is switched to the normal mode M1 or until the network communication unit 11 receives the network packet P.

In a case where the network communication unit 11 has received the network packet P in step S312 ("Y" in step S312), the packet processing unit 13 may confirm whether the network packet P received in step S312 meets at least one of the determination conditions included in the determination table T registered in the determination table storage unit 12 (step S313). For example, in a case where the determination table T illustrated in FIG. 28 is registered in the determination table storage unit 12 and where: the protocol type of the received network packet P is IPv4; the protocol kind thereof is UDP; the destination port number thereof is 5353; and the destination IP address thereof is 224.0.0.251, the packet processing unit 13 may determine that the network packet P meets at least one of the determination conditions. For example, in a case where: the protocol type of the received network packet P is IPv4; the protocol kind thereof is UDP; the destination port number thereof is 3702; and the destination MAC address thereof is not the MAC address of the image forming apparatus 3, the packet processing unit 13 may determine that the network packet P meets none of the determination conditions.

In a case where the network packet P meets at least one of the determination conditions in step S313 ("Y" in step S313), the image forming apparatus 3 may return the power mode M from the sleep mode M2 to the normal mode M1 (step S314). For example, the packet processing unit 13 may generate the return command CMD that instructs returning from the sleep mode M2 to the normal mode M1. Further, the power mode setting unit 21 may switch the power mode M of the image forming apparatus 3 from the sleep mode M2 to the normal mode M1 on the basis of the return command CMD. This may cause the processing unit 120 to start operation.

Thereafter, the image forming apparatus 3 may perform a process in accordance with the network packet P received in step S312 (step S315). For example, after the processing unit 120 starts the operation, the packet processing unit 13 may supply the reception data included in the network packet P to the processing unit 120. The controller 130 of the processing unit 120 may perform a process in accordance with the network packet P on the basis of the reception data. This may bring the flow to an end.

In a case where the network packet P meets none of the determination conditions in step S313 ("N" in step S313), the image forming apparatus 3 may discard the network packet P received in step S312 (step S316).

This may bring the flow to the end.

As described above, in the image forming apparatus 3, in a case where a certain communication protocol is set to be disabled in the apparatus setting, the determination conditions may be so registered in the determination table T as to exclude the determination condition for determining the network packet P communicated by means of the communication protocol of interest from the determination conditions. For example, in a case where the user has disabled a communication protocol related to the service that the user does not use in the apparatus setting, this allows for exclusion of the determination condition related to the disabled communication protocol. For example, referring to the examples illustrated in FIGS. 24 and 28, it is possible to prevent the respective determination conditions for the services "WndowsRally" and "NBT" which are set to be disabled as illustrated in FIG. 24 from being registered in the determination table T illustrated in FIG. 28. Accordingly, for example, it is possible to return the power mode M from the sleep mode M2 to the normal mode M1 in a case where the network packet P related to the service which the user uses is received, and it is possible to keep the power mode M to the sleep mode M2 in a case where the network packet P related to the service which the user does not use is received. As described above, in the image forming apparatus 3, it is possible to register the determination conditions on the basis of the apparatus setting of the image forming apparatus 3. It is therefore possible to effectively reduce electric power consumption.

That is, for example, in a case where the determination condition related to the service which the user does not use is registered in the determination table T, if the network packet P related to such a service is received, the power mode M may be returned from the sleep mode M2 to the normal mode M1 although the service to which the network packet P is related to is the service which the user does not use. In this case, it is difficult to effectively reduce electric power consumption. In contrast, in the image forming apparatus 3, the determination condition related to the service which the user does not use may be excluded. Therefore, in a case where the network packet P related to such a service is received, the power mode M may be kept to the sleep mode M2. Accordingly, it is possible to effectively reduce electric power consumption.

Moreover, in the image forming apparatus 3, as illustrated in FIG. 23, in a case where the determination table T still has room, the determination condition to be added may be selected in accordance with the state of the room, and the selected determination condition may be registered in the determination table T. Accordingly, it is possible to secure an opportunity to return the power mode M from the sleep mode M2 to the normal mode M1. For example, in a case where a certain communication protocol is set to be disabled in the apparatus setting, the determination table T may have room for one determination condition. Therefore, the table registration unit 134 may be able to select, for example, the determination condition related to another communication protocol set to be enabled as the determination condition to be added, and register the selected determination condition in the determination table T. That is, the number of the determination conditions registered in the determination table T may not be reduced and the room for the determination condition may be filled with another. It is therefore possible to secure an opportunity to return the power mode M from the sleep mode M2 to the normal mode M1 in a case where the network packet P related to the service which the user uses is received.

Further, in the image forming apparatus 3, in a case where the network packet P received in the sleep mode M2 meets at least one of the determination conditions, the power mode M may be returned from the sleep mode M2 to the normal mode M1, and thereafter, a process may be performed in accordance with the received network packet P. In a case where the received network packet P meets none of the determination conditions, the received network packet P may be discarded. This allows a process to be performed on the basis of the network packet P which may be necessary. It is therefore possible to effectively perform a process in accordance with the network packet P.

As described above, according to the third example embodiment, in a case where a certain communication protocol is set to be disabled, a plurality of determination conditions may be so registered in a determination table that the determination condition for determining a network packet communicated by means of the communication protocol of interest is excluded from the determination conditions. It is therefore possible to effectively reduce electric power consumption.

[Modification 3-1]

Figure 30:
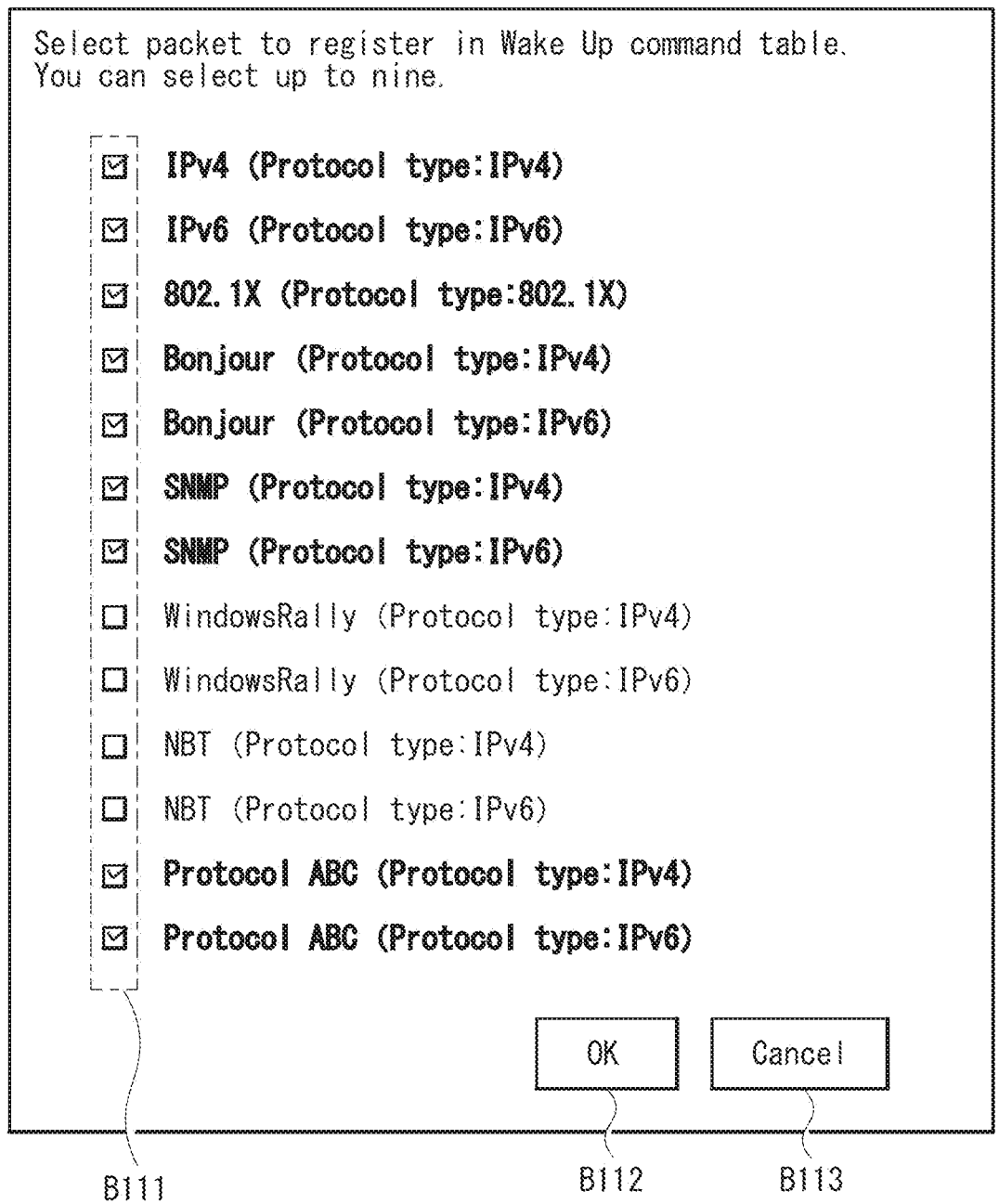
FIG. 30 is an explanatory diagram illustrating an example of a setting screen adapted to receive selection operation for determination conditions to be registered in an image forming apparatus according to a modification of the example embodiment.

According to the third example embodiment, the table registration unit 134 may determine the determination conditions to be set in the determination table T, as illustrated in FIG. 23; however, this is non-limiting. Alternatively, for example, according to Modification 3-1, the determination conditions to be registered may be customized by the user, as in a setting screen A103 illustrated in FIG. 30. The setting screen A103 may include a checkbox B111, an OK button B112, and a cancel button B113. The checkbox B111 may include thirteen checkboxes. The thirteen checkboxes may be adapted for the user to select the determination conditions to be registered from the thirteen determination conditions. The thirteen determination conditions may be the thirteen determination conditions stored in the condition data D12 illustrated in FIG. 18. In this example, the user may be allowed to select up to nine checkboxes from the thirteen checkboxes. The OK button B112 may be operated by the user in a case where the user wishes to apply the setting displayed on the setting screen A103. The cancel button B113 may be operated by the user in a case where the user wishes to cancel the setting displayed on the setting screen A103.

The display process unit 32 may generate setting screen information for the setting screen A103 described above. In this example, descriptions of the nine determination conditions registered by the process illustrated in FIG. 23 may be highlighted in bold type. The user may operate, for example, the checkbox B111 with use of the operation unit 22 to thereby select the determination conditions to be registered. The input process unit 31 may receive, on the setting screen A103, condition selection operation performed by the user. Further, the table registration unit 134 may register the determination conditions thus selected in the determination table storage unit 12 as the determination table T.

[Modification 3-2]

According to the third example embodiment, the determination table T to be registered in the determination table storage unit 12 may include nine determination conditions; however, this is non-limiting. For example, according to Modification 3-2, the determination table T may further include flag information that indicates whether each of the nine determination conditions is enabled or disabled. FIG. 31 illustrates an example of the determination table T according to Modification 3-2. In this example, the determination table T may include nine determination conditions and nine flags. The respective nine flags may be associated with the nine determination conditions. The nine flags may each indicate whether the corresponding determination condition is enabled or disabled. In this example, "1" may indicate the enabled state, and "0 (zero)" may indicate the disabled state. In this example, the respective determination conditions for the services "IPv4", "IPv6", "Bonjour", "SNMP", and "protocol ABC" may be set to "enabled", and the determination condition for the service "802.1X" may be set to "disabled". In this example, in a case where the network packet P meets at least one of the eight determination conditions set to "enabled" and included in the determination table T stored in the determination table storage unit 12, the packet processing unit 13 may generate the return command CMD of instructing switching from the sleep mode M2 to the normal mode M1.

Figure 32:
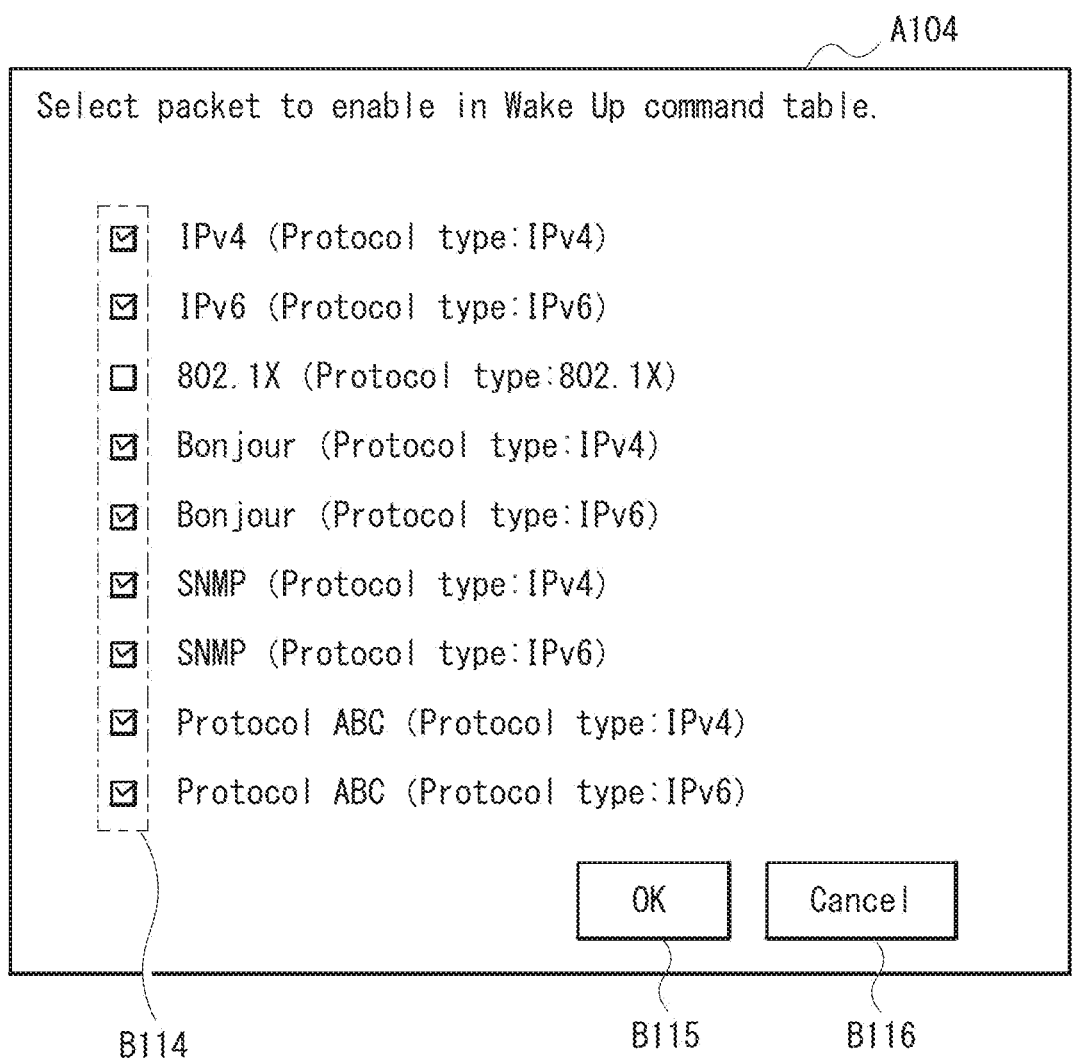
FIG. 32 is an explanatory diagram illustrating an example of a setting screen adapted to receive operation of setting the determination condition to be enabled or disabled in an image forming apparatus according to the other modification of the example embodiment.

The user may be allowed to enable or disable each of the nine determination conditions in the determination table T to be registered in the determination table storage unit 12, for example, with use of a setting screen A104 illustrated in FIG. 32. The setting screen A104 may include a checkbox B114, an OK button B115, and a cancel button B116. The checkbox B114 may include nine checkboxes. The nine checkboxes may be adapted for the user to select the determination conditions to be "enabled" from the nine determination conditions. The OK button B115 may be operated by the user in a case where the user wishes to apply the setting displayed on the setting screen A104. The cancel button B116 may be operated by the user in a case where the user wishes to cancel the setting displayed on the setting screen A104.

The display process unit 32 may generate setting screen information for the setting screen A104 described above. In this example, descriptions of the nine determination conditions set by the process illustrated in FIG. 23 may be displayed. The user may operate, for example, the checkbox B114 with use of the operation unit 22 to thereby select the determination conditions to be "enabled". In this example, the respective determination conditions for the services "IPv4", "IPv6", "Bonjour", "SNMP", and "protocol ABC" may be set to "enabled", and the determination condition for the service "802.1X" may be set to "disabled". The input process unit 31 may receive, on the setting screen A104, selection operation performed by the user. Further, the table registration unit 134 may register the nine determination conditions and the nine flags in the determination table storage unit 12 as the determination table T. The determination table T illustrated in FIG. 31 may be thus registered in the determination table storage unit 12.

In this example, the determination condition to be enabled or disabled may be identified on the basis of the nine flags; however, this is non-limiting. Alternatively, in one example, the determination condition to be enabled or disabled may be identified on the basis of information indicating the determination conditions to be enabled. In another example, the determination condition to be enabled or disabled may be identified on the basis of information indicating the determination conditions to be disabled.

Although the technology has been described with reference to some example embodiments and modifications thereof, the technology is not limited thereto, and may be modified in a variety of ways.

For example, according to the example embodiments described above, the image forming apparatuses 1 to 3 may each include the wireless communication module 10; however, this is non-limiting. Alternatively, for example, a communication module may be provided that performs communication, for example, with a network apparatus by means of wired LAN.

For example, according to the example embodiments and the modifications described above, one embodiment of the technology may be applied to a single-function printer; however, this is non-limiting. Alternatively, for example, one embodiment of the technology may be applied to a so-called multifunction peripheral (MFP) having multiple functions including, without limitation, a copy function, a fax function, a scan function, and a print function.

For example, according to the example embodiments and the modifications described above, one embodiment of the technology may be applied to an image forming apparatus; however, this is non-limiting. For example, one embodiment of the technology may be applicable to various information processing apparatuses that perform communication.

Furthermore, the technology encompasses any possible combination of some or all of the various embodiments and the modifications described herein and incorporated herein. It is possible to achieve at least the following configurations from the above-described example embodiments of the technology.

(1)

An information processing apparatus including:

a communication unit that receives a communication packet;

a determination unit that determines whether the communication packet received by the communication unit in a second power mode of a first power mode and the second power mode meets at least one of a plurality of determination conditions included in determination condition information, the second power mode being lower in electric power consumption than the first power mode;

a power mode setting unit that switches a power mode from the second power mode to the first power mode on the basis of a result of determination performed by the determination unit;

an input process unit that receives user operation; and a registration unit that registers the plurality of determination conditions in the determination condition information on the basis of the user operation received by the input process unit.

(2)

The information processing apparatus according to (1), in which the input process unit receives selection operation of selecting one of a plurality of pieces of determination condition information, and the registration unit registers, as the plurality of determination conditions, determination conditions included in the determination condition information selected by the selection operation.

(3)

The information processing apparatus according to (2), further including a display process unit that performs a display process of displaying options of packet kinds of the communication packet carried by a network coupled to the communication unit, in which the selection operation includes operation of selecting one of the packet kinds.

(4)

The information processing apparatus according to (3), in which the plurality of pieces of determination condition information includes first determination condition information and second determination condition information, and one or more determination conditions of a plurality of first determination conditions included in the first determination condition information are identical to one or more determination conditions of a plurality of second determination conditions included in the second determination condition information.

(5)

The information processing apparatus according to (3), in which the plurality of pieces of determination condition information includes first determination condition information and second determination condition information, two or more determination conditions of a plurality of first determination conditions included in the first determination condition information are identical to two or more determination conditions of a plurality of second determination conditions included in the second determination condition information, one or more determination conditions other than the two or more determination conditions of the plurality of first determination conditions are related to a first packet kind, one or more determination conditions other than the two or more determination conditions of the plurality of second determination conditions are related to a second packet kind, the two or more determination conditions of the plurality of first determination conditions include a determination condition related to the first packet kind and a determination condition related to the second packet kind, and the two or more determination conditions of the plurality of second determination conditions include the determination condition related to the first packet kind and the determination condition related to the second packet kind.

(6)

The information processing apparatus according to (5), in which the determination condition related to the first packet kind included in the two or more determination conditions of the plurality of first determination conditions and of the plurality of second determination conditions indicates a communication service that is identical to a communication service indicated by the determination condition related to the second packet kind included in the two or more determination conditions of the plurality of first determination conditions and of the plurality of second determination conditions.

(7)

The information processing apparatus according to any one of (1) to (6), in which the input process unit receives operation, performed by a user, of selecting one or more determination conditions to be enabled from the plurality of determination conditions included in the determination condition information, the determination condition information includes enabled information indicating the one or more determination conditions, and the determination unit determines whether the communication packet received by the communication unit in the second power mode meets at least one of the one or more determination conditions.

(8)

The information processing apparatus according to any one of (1) to (7), further including a setting unit that sets a first communication protocol to be enabled or disabled, the first communication protocol being supported by the communication unit, in which the registration unit excludes, in a case where the first communication protocol is set to be disabled, a first determination condition for the communication packet communicated by the first communication protocol from the plurality of determination conditions, and thereby registers the plurality of determination conditions in the determination condition information.

(9)

The information processing apparatus according to (1), further including a display process unit, in which the input process unit receives selection operation of selecting one of the plurality of pieces of determination condition information, the display process unit performs a display process of displaying two or more determination conditions including a plurality of first determination conditions included in the determination condition information selected by the selection operation and of highlighting the plurality of first determination conditions, the input process unit receives condition selection operation for the two or more determination conditions, and the registration unit registers a plurality of second determination conditions selected by the condition selection operation as the plurality of determination conditions.

(10)

The information processing apparatus according to any one of (2) to (6), further including:

a history management unit that generates reception history information on the basis of the communication packet received by the communication unit in the first power mode; and an alert process unit that decides one of the plurality of pieces of determination condition information as recommended determination condition information on the basis of the reception history information, and performs an alert process in a case where the determination condition information selected by the selection operation and the recommended determination condition information do not match each other.

(11)

The information processing apparatus according to (10), in which the alert process unit determines, on the basis of the reception history information, a packet kind of the communication packet carried by a network coupled to the communication unit, and thereby decides the recommended determination condition information.

(12)

The information processing apparatus according to (10) or (11), in which the alert process unit performs the alert process when the power mode is to be switched from the first power mode to the second power mode.

(13)

The information processing apparatus according to (10) or (11), in which the alert process unit performs the alert process when the input process unit receives the selection operation.

(14)

The information processing apparatus according to (13), in which the input process unit receives instruction operation of instructing to register, as the plurality of determination conditions, a plurality of determination conditions included in the determination condition information selected by the selection operation after the alert process, and the registration unit registers the plurality of determination conditions on the basis of the instruction operation.

(15)

An information processing apparatus including:

a communication unit that receives a communication packet;

a determination unit that determines whether the communication packet received by the communication unit in a second power mode of a first power mode and the second power mode meets at least one of a plurality of determination conditions included in determination condition information, the second power mode being lower in electric power consumption than the first power mode;

a power mode setting unit that switches a power mode from the second power mode to the first power mode on the basis of a result of determination performed by the determination unit;

a setting unit that sets a first communication protocol to be enabled or disabled, the first communication protocol being supported by the communication unit; and a registration unit that excludes, in a case where the first communication protocol is set to be disabled, a first determination condition for the communication packet communicated by the first communication protocol from the plurality of determination conditions, and thereby registers the plurality of determination conditions in the determination condition information.

(16)

The information processing apparatus according to (15), in which the registration unit registers, in the case where the first communication protocol is set to be disabled, the plurality of determination conditions excluding the first determination condition in the determination condition information.

(17)

The information processing apparatus according to (16), in which the determination condition information is to include predetermined number of determination conditions, the setting unit sets a second communication protocol to be enabled or disabled, the second communication protocol being supported by the communication unit, the registration unit registers the plurality of determination conditions including the first determination condition and a second determination condition for the communication packet communicated by the second communication protocol, in a case where the second communication protocol is set to be enabled and where the first communication protocol is set to be enabled, and the registration unit registers the plurality of determination conditions including the second determination condition and excluding the first determination condition, in a case where the second communication protocol is set to be enabled and where the first communication protocol is set to be disabled.

(18)

The information processing apparatus according to (15), in which the registration unit registers, in the determination condition information, disabled information and the plurality of determination conditions including the first determination condition, in a case where the first communication protocol is set to be disabled, the disabled information indicating to disable the first determination condition, and the determination unit determines whether the communication packet received by the communication unit in the second power mode meets at least one of two or more determination conditions other than the first determination condition of the plurality of determination conditions.

(19)

The information processing apparatus according to any one of (15) to (18), in which the registration unit registers the plurality of determination conditions when the power mode is to be switched from the first power mode to the second power mode.

(20)

The information processing apparatus according to (15), further including:

a display process unit that performs a display process of displaying two or more determination conditions including the plurality of determination conditions other than the first determination condition; and an input process unit that receives user operation, the input process unit receiving condition selection operation for the two or more determination conditions, in which the registration unit registers determination conditions selected by the condition selection operation.

(21)

The information processing apparatus according to (15), further including an input process unit that receives user operation, the input process unit receiving selection operation of selecting one of a plurality of pieces of determination condition information, in which the registration unit excludes, in the case where the first communication protocol is set to be disabled, the first determination condition from the plurality of determination conditions included in the determination condition information selected by the selection operation, and thereby registers the plurality of determination conditions in the determination condition information.

(22)

The information processing apparatus according to (21), further including a display process unit that performs a display process of displaying options of packet kinds of the communication packet carried by a network coupled to the communication unit, in which the selection operation includes operation of selecting one of the packet kinds.

(23)

The information processing apparatus according to (21), in which the plurality of pieces of determination condition information includes first determination condition information and second determination condition information, two or more determination conditions of a plurality of first determination conditions included in the first determination condition information are identical to two or more determination conditions of a plurality of second determination conditions included in the second determination condition information, one or more determination conditions other than the two or more determination conditions of the plurality of first determination conditions are related to a first packet kind, one or more determination conditions other than the two or more determination conditions of the plurality of second determination conditions are related to a second packet kind, the two or more determination conditions of the plurality of first determination conditions include a determination condition related to the first packet kind and a determination condition related to the second packet kind, and the two or more determination conditions of the plurality of second determination conditions include the determination condition related to the first packet kind and the determination condition related to the second packet kind.

(24)

The information processing apparatus according to (23), in which the determination condition related to the first packet kind included in the two or more determination conditions of the plurality of first determination conditions and of the plurality of second determination conditions indicates a communication service that is identical to a communication service indicated by the determination condition related to the second packet kind included in the two or more determination conditions of the plurality of first determination conditions and of the plurality of second determination conditions.

(25)

An information processing method including:

receiving a communication packet;

determining whether the communication packet received in a second power mode of a first power mode and the second power mode meets at least one of a plurality of determination conditions included in determination condition information, the second power mode being lower in electric power consumption than the first power mode;

switching a power mode from the second power mode to the first power mode on the basis of a result of the determining; and registering the plurality of determination conditions in the determination condition information.

(26)

The information processing method according to (25), further including receiving user operation, in which the registering of the plurality of determination conditions in the determination condition information includes registering the plurality of determination conditions on the basis of the received user operation.

(27)

The information processing method according to (25), further including setting a supported first communication protocol to be enabled or disabled, in which the registering of the plurality of determination conditions in the determination condition information includes excluding, in a case where the first communication protocol is set to be disabled, a first determination condition for the communication packet communicated by the first communication protocol from the plurality of determination conditions, and thereby registering the plurality of determination conditions.

According to each of the information processing apparatus and the information processing method of one embodiment of the technology, it is possible to effectively reduce electric power consumption.

Although the technology has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. An information processing apparatus, comprising:
a processor; and
a non-transitory computer readable medium containing program instructions, execution of which by the processor causes the information processing apparatus to perform the following steps:
receiving a communication packet;
determining whether the communication packet received in a second power mode among a first power mode and the second power mode meets at least one of a plurality of determination conditions included in determination condition information, the second power mode being lower in electric power consumption than the first power mode;
switching a power mode from the second power mode to the first power mode on a basis of a result of determination;
receiving user operation; and
registering the plurality of determination conditions in the determination condition information on a basis of the user operation, wherein the registering the plurality of determination conditions in the determination condition information includes
receiving a selection operation, performed by a user, of selecting one of the plurality of determination conditions included in the determination condition information, and
registering, as the plurality of determination conditions, determination conditions included in the determination condition information selected by the selection operation, the determination condition information includes first determination condition information and second determination condition information, the first determination condition information includes a plurality of first determination conditions and the second determination condition information includes a plurality of second determination conditions, two or more determination conditions included in the plurality of first determination conditions are identical to two or more determination conditions included in the plurality of second determination conditions, one or more determination conditions other than the two or more determination conditions of the plurality of first determination conditions are related to a first packet kind, one or more determination conditions other than the two or more determination conditions of the plurality of second determination conditions are related to a second packet kind, the two or more determination conditions of the plurality of first determination conditions include a determination condition related to the first packet kind and a determination condition related to the second packet kind, and the two or more determination conditions of the plurality of second determination conditions include the determination condition related to the first packet kind and the determination condition related to the second packet kind.

2. The information processing apparatus according to claim 1, wherein the steps further includes performing a display process of displaying options of packet kinds of the communication packet carried by a network coupled to the communication unit, the options of packet kinds including the first and second packet kinds, wherein
the selection operation includes selecting one of the options of packet kinds.

3. The information processing apparatus according to claim 1, wherein
the determination condition related to the first packet kind included in the two or more determination conditions of the plurality of first determination conditions and of the plurality of second determination conditions indicates a communication service that is identical to a communication service indicated by the determination condition related to the second packet kind included in the two or more determination conditions of the plurality of first determination conditions and of the plurality of second determination conditions.

4. The information processing apparatus according to claim 1, wherein
the receiving the user operation includes receiving an operation, performed by a user, of selecting one or more determination conditions to be enabled from the plurality of determination conditions included in the determination condition information, the determination condition information includes enabled information indicating the one or more determination conditions, and the determining whether the communication packet received in the second power mode meets the at least one of the plurality of determination conditions includes determining whether the communication packet received in the second power mode meets at least one of the one or more determination conditions.

5. The information processing apparatus according to claim 1, wherein the steps further include setting a first communication protocol to be enabled or disabled, wherein the registering the plurality of determination conditions includes excluding, in a case where the first communication protocol is set to be disabled, a first determination condition for the communication packet communicated by the first communication protocol from the plurality of determination conditions, and thereby registering the plurality of determination conditions in the determination condition information.

6. An information processing method, comprising:

receiving a communication packet;

determining whether the communication packet received in a second power mode of a first power mode and the second power mode meets at least one of a plurality of determination conditions included in determination condition information, the second power mode being lower in electric power consumption than the first power mode;

switching a power mode from the second power mode to the first power mode on a basis of a result of the determining; and registering the plurality of determination conditions in the determination condition information, wherein the registering the plurality of determination conditions in the determination condition information includes receiving a selection operation, performed by a user, of selecting one of the plurality of determination conditions included in the determination condition information, and registering, as the plurality of determination conditions, determination conditions included in the determination condition information selected by the selection operation, the determination condition information includes first determination condition information and second determination condition information, the first determination condition information includes a plurality of first determination conditions and the second determination condition information includes a plurality of second determination conditions, two or more determination conditions included in the plurality of first determination conditions are identical to two or more determination conditions included in the plurality of second determination conditions, one or more determination conditions other than the two or more determination conditions of the plurality of first determination conditions are related to a first packet kind, one or more determination conditions other than the two or more determination conditions of the plurality of second determination conditions are related to a second packet kind, the two or more determination conditions of the plurality of first determination conditions include a determination condition related to the first packet kind and a determination condition related to the second packet kind, and the two or more determination conditions of the plurality of second determination conditions include the determination condition related to the first packet kind and the determination condition related to the second packet kind.

7. The information processing method according to claim 6, further comprising setting a supported first communication protocol to be enabled or disabled, wherein the registering of the plurality of determination conditions in the determination condition information includes excluding, in a case where the first communication protocol is set to be disabled, a first determination condition for the communication packet communicated by the first communication protocol from the plurality of determination conditions, and thereby registering the plurality of determination conditions.

* * * * *